US012581466B2

(12) United States Patent
Sachidanand Sinha et al.

(10) Patent No.: US 12,581,466 B2
(45) Date of Patent: Mar. 17, 2026

(54) SLOT LEVEL CONFIGURATION AND CONTROL MESSAGE

(71) Applicant: QUALCOMM Incorporated, San Diego, CA (US)

(72) Inventors: Abhishek Saurabh Sachidanand Sinha, San Diego, CA (US); Senthilkumar Sundaram, San Diego, CA (US); Christian Oliver Thelen, San Diego, CA (US); Michael Francis Garyantes, Bradley Beach, NJ (US); Deepak Agarwal, San Diego, CA (US); Orod Raeesi, Uusimaa (FI); James Krysl, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 583 days.

(21) Appl. No.: 18/068,964

(22) Filed: Dec. 20, 2022

(65) Prior Publication Data

US 2023/0217422 A1      Jul. 6, 2023

Related U.S. Application Data

(60) Provisional application No. 63/266,436, filed on Jan. 5, 2022.

(51) Int. Cl.
*H04W 72/0446*      (2023.01)
*H04B 7/06*      (2006.01)
(Continued)

(52) U.S. Cl.
CPC ...... *H04W 72/0446* (2013.01); *H04B 7/0617* (2013.01); *H04L 5/14* (2013.01); *H04W 72/20* (2023.01)

(58) Field of Classification Search
CPC ............. H04W 72/0446; H04W 72/20; H04W 88/085; H04B 7/0617; H04B 1/40; H04L 5/14; H04L 5/005
See application file for complete search history.

(56) References Cited

U.S. PATENT DOCUMENTS

2021/0120527 A1      4/2021   Rhim et al.
2021/0120531 A1*     4/2021   Jeon ................... H04W 72/046
(Continued)

OTHER PUBLICATIONS

ETSI Secretariat: "DTS/MSG-001140 TS 103 859 Early Draft prepared by ETSI Secretariat based on Contribution MSG(21)000017r1", MSG(22)000001, European Telecommunications Standards Institute, 650, Route Des Lucioles, F-06921 Sophia-Antipolis, France vol. TC MSG Mobile Standards Group, Dec. 3, 2021, 306 Pages, ETSI TS 103 859, V1.0.0, XP014418778, paragraph 7.4.2 paragraph 7.4.4.
(Continued)

*Primary Examiner* — Tejis Daya
(74) *Attorney, Agent, or Firm* — Harrity & Harrity LLP

(57) ABSTRACT

Various aspects of the present disclosure generally relate to wireless communication. In some aspects, a radio unit (RU) may receive, from a distributed unit (DU), a control plane message associated with a section type that is dedicated for slot level configuration information. The control plane message may include a common section header that identifies a group of one or more endpoints, and one or more section type commands that include information associated with a slot level common configuration for the group of one or more endpoints. The RU may perform at least one of radio frequency configuration or time domain beamforming for the group of one or more endpoints based at least in part on the information included in the one or more section type commands. Numerous other aspects are described.

30 Claims, 14 Drawing Sheets

700 ➤

| Section Type 8: Slot level Config | | | | | | | | | |
|---|---|---|---|---|---|---|---|---|---|
| 0 (msb) | 1 | 2 | 3 | 4 | 5 | 6 | 7 (lsb) | # of bytes | |
| Transport header, see section 5.1.3 | | | | | | | | 1 | Octet 1 |
| dataDirection | Payload Version | | | scs | | | | 1 | Octet 9 |
| frameID | | | | | | | | 1 | Octet 10 |
| subframeID | | | | slotID | | | | 1 | Octet 11 |
| slotID | | | startSymbolID | | | | | 1 | Octet 12 |
| reserved | | | eAxCSubFieldMask | | | | | 1 | Octet 13 |
| numberOfSecType8Cmds | | | | | | | | 1 | Octet 14 |
| sectionType = 8 | | | | | | | | 1 | Octet 15 |
| Reserved (8 bits) | | | | | | | | 1 | Octet 16 |

705 ➤

710

(51) Int. Cl.
  H04L 5/14    (2006.01)
  H04W 72/20    (2023.01)

(56)        References Cited

U.S. PATENT DOCUMENTS

| | | | |
|---|---|---|---|
| 2021/0135722 A1 | 5/2021 | Ahmed et al. | |
| 2021/0136788 A1 | 5/2021 | Lim et al. | |
| 2021/0243840 A1* | 8/2021 | Raghothaman | H04L 5/0044 |
| 2022/0123854 A1* | 4/2022 | Cederholm | H04L 1/0009 |
| 2023/0057921 A1* | 2/2023 | Sundaram | H04L 5/0023 |
| 2023/0224118 A1* | 7/2023 | Lim | H04L 5/0094 |
| | | | 370/329 |
| 2023/0403692 A1* | 12/2023 | Jeon | H04W 28/16 |

OTHER PUBLICATIONS

International Search Report and Written Opinion—PCT/US2022/082156—ISA/EPO—Apr. 3, 2023.
Qualcomm CDMA Technologies: "ORAN WG4 Specification CUS. 0-v07.01", ETSI Draft; MSG(21)000017R1, European Telecommunications Standards Institute (ETSI), 650, Route Des Lucioles, F-06921 Sophia-Antipolis Cedex, France, vol. TC MSG Mobile Standards Group, Nov. 22, 2021, XP014412029, pp. 1-320, 4.1 Architectural Split, paragraph 7.4.7.19 paragraph 7.5.9.

\* cited by examiner

Figure 5:
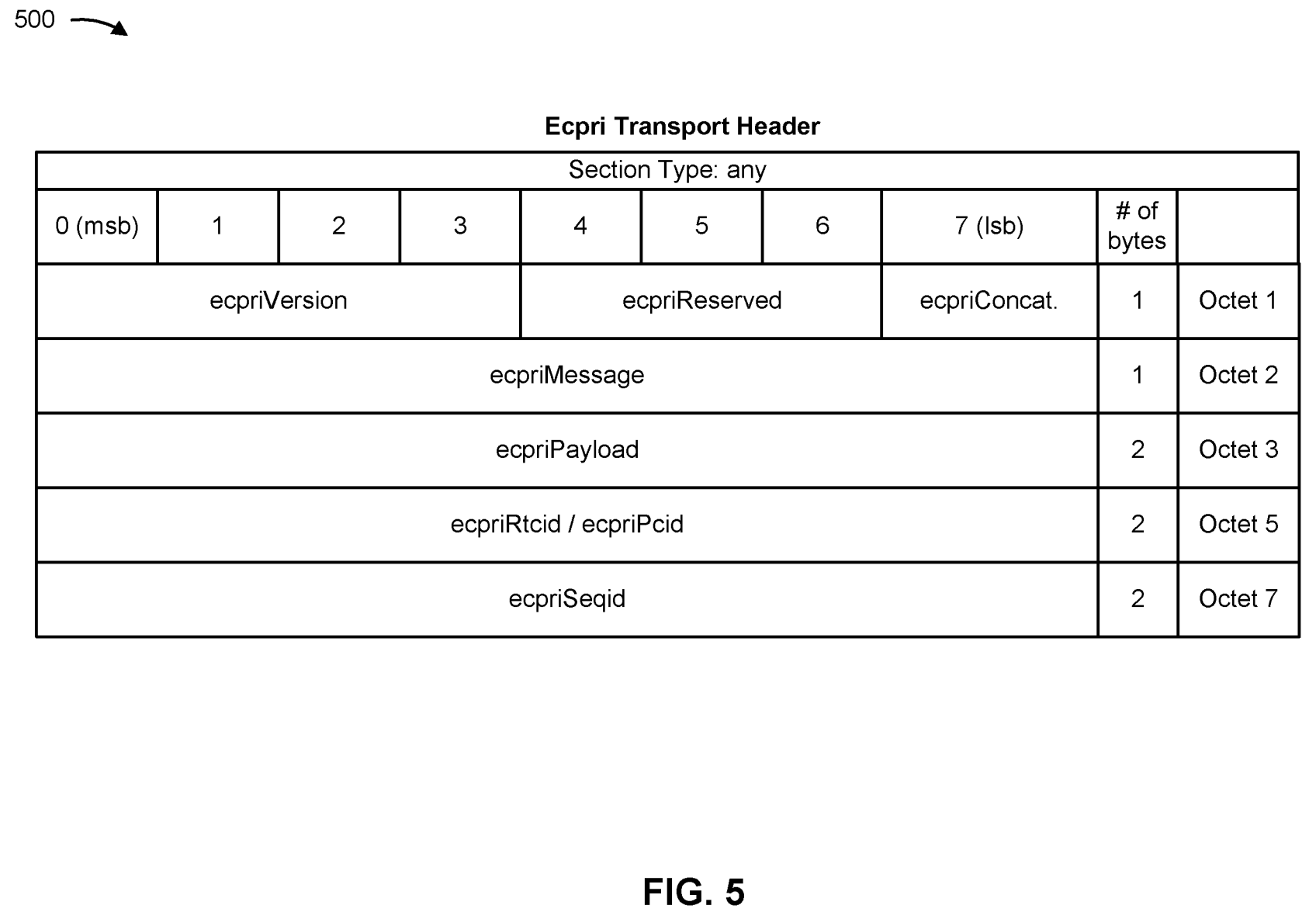

Ecpri Transport Header

| Section Type: any | | | | | | | | # of bytes | |
|---|---|---|---|---|---|---|---|---|---|
| 0 (msb) | 1 | 2 | 3 | 4 | 5 | 6 | 7 (lsb) | | |
| ecpriVersion | | | | ecpriReserved | | | ecpriConcat. | 1 | Octet 1 |
| ecpriMessage | | | | | | | | 1 | Octet 2 |
| ecpriPayload | | | | | | | | 2 | Octet 3 |
| ecpriRtcid / ecpriPcid | | | | | | | | 2 | Octet 5 |
| ecpriSeqid | | | | | | | | 2 | Octet 7 |

615
RU capability exchange using M-plane, including indication of supported section types 620
C-plane message associated with dedicated section type including common section header and one or more section type commands

625

RF configuration and/ or time domain beamforming based on information in C-plane message 630
Downlink and/or uplink communications

700

| Section Type 8: Slot level Config | | | | | | | | |
|---|---|---|---|---|---|---|---|---|
| 0 (msb) | 1 | 2 | 3 | 4 | 5 | 6 | 7 (lsb) | # of bytes |
| Transport header, see section 5.1.3 | | | | | | | | Octet 1 |
| dataDirection | Payload Version | | | | scs | | | 1 — Octet 9 |
| frameID | | | | | | | | 1 — Octet 10 |
| subframeID | | | | slotID | | | | 1 — Octet 11 |
| slotID | | startSymbolID | | | | | | 1 — Octet 12 |
| reserved | eAxCSubFieldMask | | | | | | | 1 — Octet 13 |
| numberOfSecType8Cmds | | | | | | | | 1 — Octet 14 |
| sectionType = 8 | | | | | | | | 1 — Octet 15 |
| Reserved (8 bits) | | | | | | | | 1 — Octet 16 |

| 0 (msb) | 1 | 2 | 3 | 4 | 5 | 6 | 7 (lsb) | # of bytes | |
|---|---|---|---|---|---|---|---|---|---|
| | | | Transport header | | | | | 8 | Octet 1 |
| | | | Common SecType 8 Header | | | | | 8 | Octet 9 |
| reserved | | | | | secType8CmdType[3:0] = 1 | | | 1 | Octet 17 |
| secType8CmdLen[15:8] = variable | | | | | | | | 1 | Octet 18 |
| secType8CmdLen[7:0] | | | | | | | | 1 | Octet 19 |
| reserved | | | | | | | | 1 | Octet 20 |
| reserved | | | | symMask[13:8] | | | | 1 | Octet 21 |
| symMask[7:0] | | | | | | | | 1 | Octet 22 |
| disableBFWs | | | | tdBeamGrpId[15:8] | | | | 1 | Octet 23 |
| tdBeamGrpId[7:0] | | | | | | | | 1 | Octet 24 |
| numAntElements[15:8] | | | | | | | | 1 | Octet 25 |
| numAntElements[7:0] | | | | | | | | 1 | Octet 26 |
| numTdBeams[7:0] | | | | | | | | 1 | Octet 27 |
| bfwCompHdr | | | | | | | | 1 | Octet 28 |
| reserved | | | | tdBeamId0[14:8] | | | | 1 | |
| tdBeamId0[7:0] | | | | | | | | 1 | |
| bfwCompParam | | | | | | | | var | |
| bfwI (for TRX 0) | | | | | | | | var | |
| bfwQ (for TRX 0) | | | | | | | | var | |
| Remaining TD beamforming weights bfwI and bfwQ up to K TRXs for K'th beamId | | | | | | | | var | |
| Zero pad to 4-byte boundary | | | | | | | | var | |
| ● ● ● | | | | | | | | | |
| reserved | | | | tdBeamIdN[14:8] | | | | 1 | |
| tdBeamIdN[7:0] | | | | | | | | 1 | |
| bfwCompParam | | | | | | | | var | |
| bfwI (TRX 0) | | | | | | | | var | |
| bfwQ (TRX 0) | | | | | | | | var | |
| Remaining TD beamforming weights bfwI and bfwQ up to K TRXs for K'th beamId | | | | | | | | var | |
| Zero pad to 4-byte boundary | | | | | | | | var | |

| Section Type 8: secType8CmdType 'TDD Configuration Pattern' | | | | | | | | | # of bytes | |
|---|---|---|---|---|---|---|---|---|---|---|
| 0 (msb) | 1 | 2 | 3 | 4 | 5 | 6 | 7 (lsb) | | | |
| Transport header | | | | | | | | | 8 | Octet 1 |
| common SecType 8 Header | | | | | | | | | 8 | Octet 9 |
| reserved | | | | | | secType8CmdType[3:0] = 2 | | | 1 | Octet 17 |
| secType8CmdLen[15:8] = 2 (2words) | | | | | | | | | 1 | Octet 18 |
| secType8CmdLen[7:0] | | | | | | | | | 1 | Octet 19 |
| reserved | | | | | | | | | 1 | Octet 20 |
| reserved | | | | dirPattern[13:8] | | | | | 1 | Octet 21 |
| dirPattern[7:0] | | | | | | | | | 1 | Octet 22 |
| reserved | | | | guardPattern[13:8] | | | | | 1 | Octet 23 |
| guardPattern[7:0] | | | | | | | | | 1 | Octet 24 |

| Section Type 8: secType8CmdType 'TDD Configuration Pattern' | | | | | | | | # of bytes | |
|---|---|---|---|---|---|---|---|---|---|
| 0 (msb) | 1 | 2 | 3 | 4 | 5 | 6 | 7 (lsb) | | |
| Transport header | | | | | | | | 8 | Octet 1 |
| common SecType 8 Header | | | | | | | | 8 | Octet 9 |
| reserved | | | | secType8CmdType[3:0] = 3 | | | | 1 | Octet 17 |
| secType8CmdLen[15:8] = 2 (2words) | | | | | | | | 1 | Octet 18 |
| secType8CmdLen[7:0] | | | | | | | | 1 | Octet 19 |
| reserved | | | | | | | | 1 | Octet 20 |
| reserved | | | IdlePattern[13:8] | | | | | 1 | Octet 21 |
| IdlePattern[7:0] | | | | | | | | 1 | Octet 22 |
| reserved (8 bits) | | | | | | | | 2 | Octet 23 |

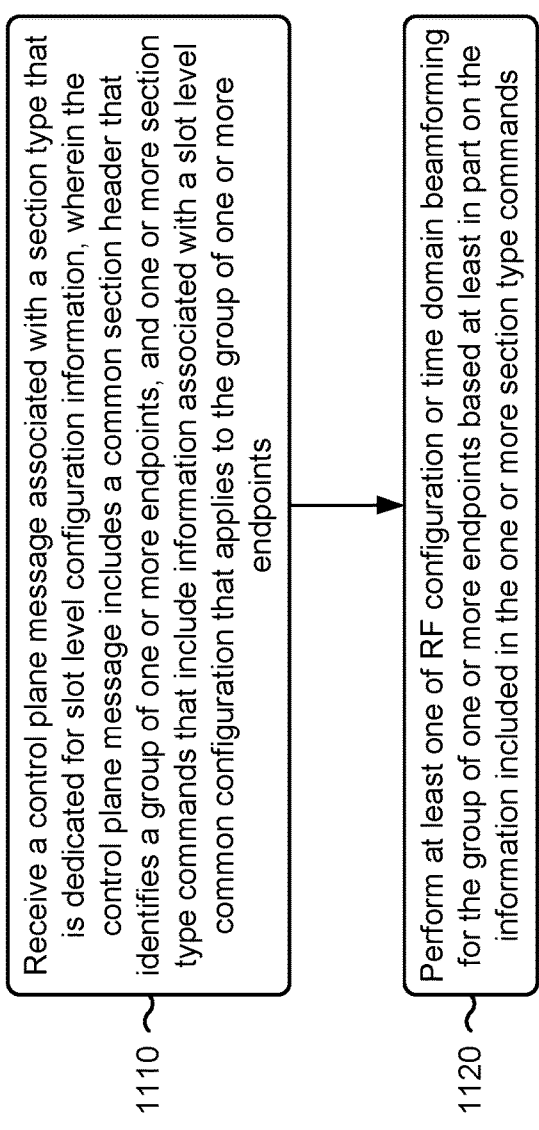

1110 — Receive a control plane message associated with a section type that is dedicated for slot level configuration information, wherein the control plane message includes a common section header that identifies a group of one or more endpoints, and one or more section type commands that include information associated with a slot level common configuration that applies to the group of one or more endpoints

1120 — Perform at least one of RF configuration or time domain beamforming for the group of one or more endpoints based at least in part on the information included in the one or more section type commands

Figure 12:
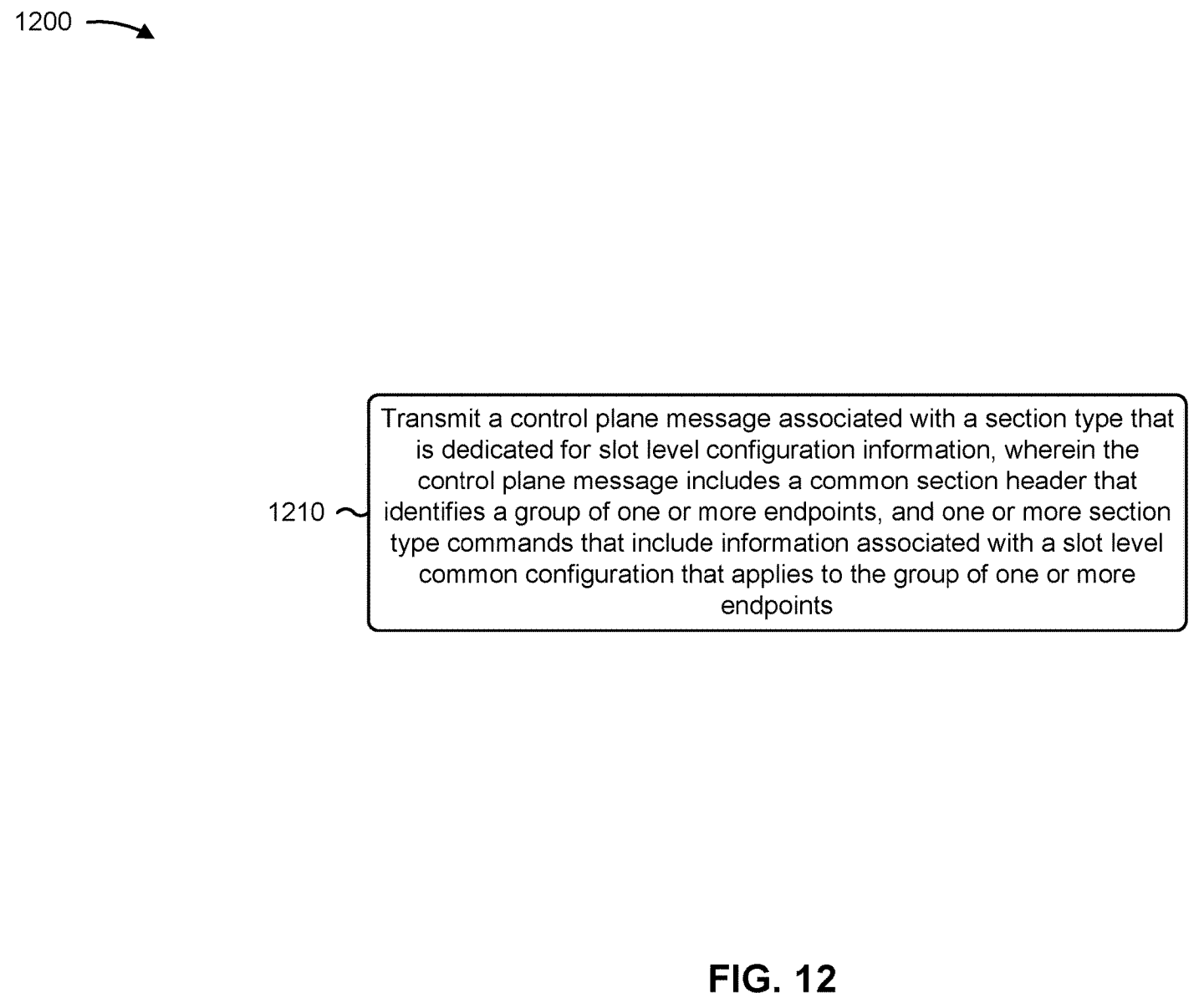

Transmit a control plane message associated with a section type that is dedicated for slot level configuration information, wherein the control plane message includes a common section header that identifies a group of one or more endpoints, and one or more section type commands that include information associated with a slot level common configuration that applies to the group of one or more endpoints

SLOT LEVEL CONFIGURATION AND CONTROL MESSAGE

CROSS-REFERENCE TO RELATED APPLICATION

This Patent application claims priority to U.S. Provisional Patent Application No. 63/266,436, filed on Jan. 5, 2022, entitled "SLOT LEVEL CONFIGURATION AND CONTROL MESSAGE," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for a slot level configuration and control message in an open radio access network (O-RAN).

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 5 is a diagram illustrating an example of a transport header for a message in an O-RAN, in accordance with the present disclosure.

FIGS. 6-10 are diagrams illustrating examples associated with a slot level configuration and control message in an O-RAN, in accordance with the present disclosure.

FIGS. 11-12 are diagrams illustrating example processes associated with a slot level configuration and control message in an O-RAN, in accordance with the present disclosure.

SUMMARY

Figure 1:
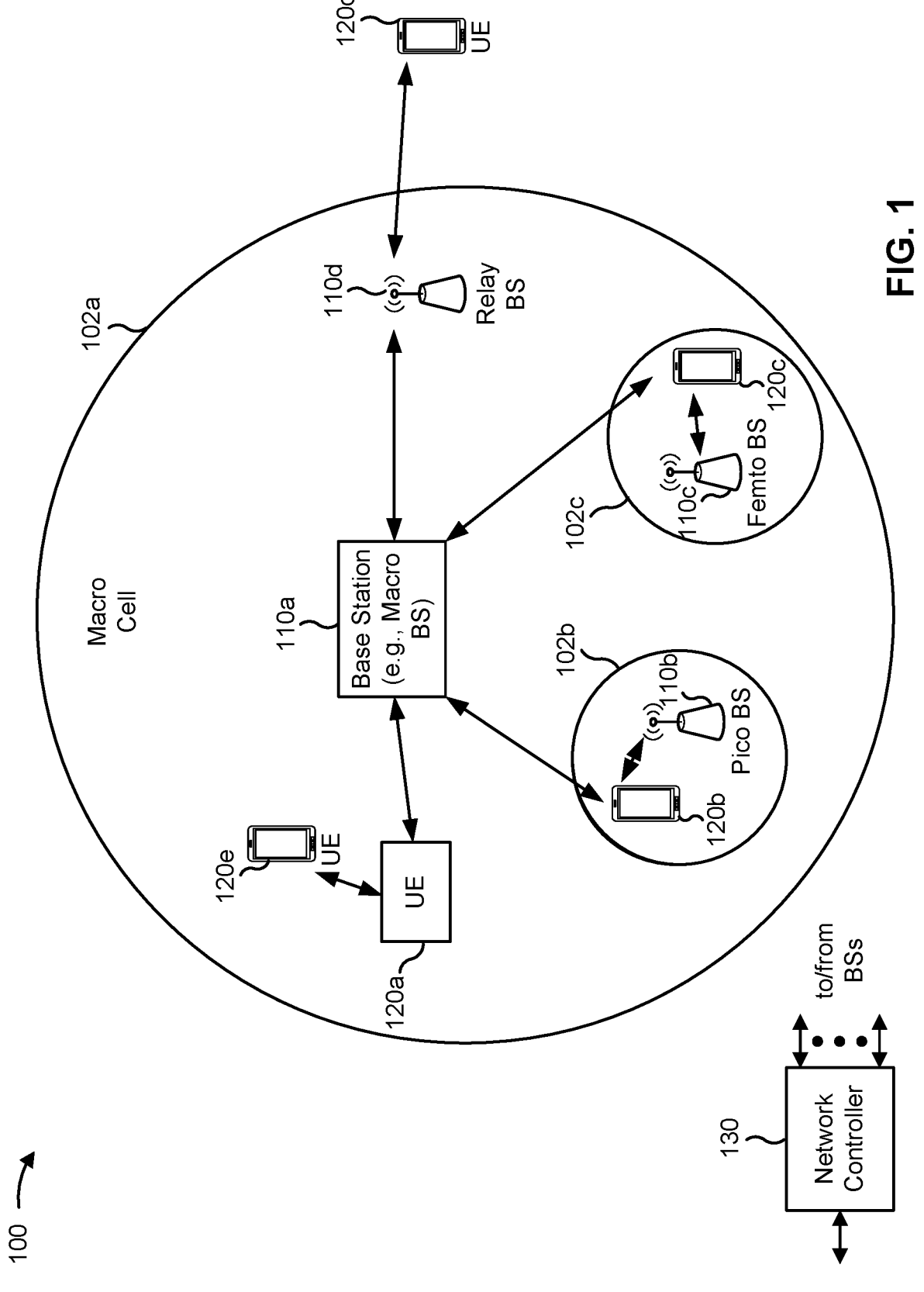
FIG. 1 is a diagram illustrating an example of a wireless network, in accordance with the present disclosure.

Some aspects described herein relate to a radio unit (RU) for wireless communication. The radio unit may include a memory and one or more processors coupled to the memory. The one or more processors may be configured to receive, from a distributed unit (DU), a control plane message associated with a section type that is dedicated for slot level configuration information. The control plane message may include a common section header that identifies a group of one or more endpoints, and one or more section type commands associated with the common section header. The one or more section type commands may include information associated with a slot level common configuration that applies to the group of one or more endpoints. The one or more processors may be configured to perform at least one of radio frequency configuration or time domain beamforming for the group of one or more endpoints based at least in part on the information included in the one or more section type commands.

Some aspects described herein relate to a DU for wireless communication. The distributed unit may include a memory and one or more processors coupled to the memory. The one or more processors may be configured to transmit, to an RU, a control plane message associated with a section type that is dedicated for slot level configuration information. The control plane message may include a common section header that identifies a group of one or more endpoints, and one or more section type commands associated with the common section header. The one or more section type commands may include information associated with a slot level common configuration that applies to the group of one or more endpoints.

Some aspects described herein relate to a method of wireless communication performed by an RU. The method may include receiving, from a DU, a control plane message associated with a section type that is dedicated for slot level configuration information. The control plane message may include a common section header that identifies a group of one or more endpoints, and one or more section type commands associated with the common section header. The one or more section type commands may include information associated with a slot level common configuration that applies to the group of one or more endpoints. The method may include performing at least one of radio frequency configuration or time domain beamforming for the group of one or more endpoints based at least in part on the information included in the one or more section type commands.

Some aspects described herein relate to a method of wireless communication performed by a DU. The method may include transmitting, to an RU, a control plane message associated with a section type that is dedicated for slot level configuration information. The control plane message may include a common section header that identifies a group of one or more endpoints, and one or more section type commands associated with the common section header. The one or more section type commands may include information associated with a slot level common configuration that applies to the group of one or more endpoints.

Some aspects described herein relate to a non-transitory computer-readable medium that stores a set of instructions for wireless communication by an RU. The set of instructions, when executed by one or more processors of the RU, may cause the RU to receive, from a DU, a control plane message associated with a section type that is dedicated for slot level configuration information. The control plane message may include a common section header that identifies a group of one or more endpoints, and one or more section type commands associated with the common section header. The one or more section type commands may include information associated with a slot level common configuration that applies to the group of one or more endpoints. The set of instructions, when executed by one or more processors of the RU, may cause the RU to perform at least one of radio frequency configuration or time domain beamforming for the group of one or more endpoints based at least in part on the information included in the one or more section type commands.

Some aspects described herein relate to a non-transitory computer-readable medium that stores a set of instructions for wireless communication by a DU. The set of instructions, when executed by one or more processors of the DU, may cause the DU to transmit, to an RU, a control plane message associated with a section type that is dedicated for slot level configuration information. The control plane message may include a common section header that identifies a group of one or more endpoints, and one or more section type commands associated with the common section header. The one or more section type commands may include information associated with a slot level common configuration that applies to the group of one or more endpoints.

Some aspects described herein relate to an apparatus for wireless communication. The apparatus may include means for receiving, from a DU, a control plane message associated with a section type that is dedicated for slot level configuration information. The control plane message may include a common section header that identifies a group of one or more endpoints, and one or more section type commands associated with the common section header. The one or more section type commands may include information associated with a slot level common configuration that applies to the group of one or more endpoints. The apparatus may include means for performing at least one of radio frequency configuration or time domain beamforming for the group of one or more endpoints based at least in part on the information included in the one or more section type commands.

Some aspects described herein relate to an apparatus for wireless communication. The apparatus may include means for transmitting, to an RU, a control plane message associated with a section type that is dedicated for slot level configuration information. The control plane message may include a common section header that identifies a group of one or more endpoints, and one or more section type commands associated with the common section header. The one or more section type commands may include information associated with a slot level common configuration that applies to the group of one or more endpoints. The apparatus may include means for receiving, from the RU, a management plane message including an indication that the section type is supported by the RU and an indication of one or more supported command types associated with the section type, wherein each of the one or more section type commands included in the control plane message is associated with a command type of the one or more supported command types indicated in the management plane message.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

As indicated above, FIG. 1 is provided as an example. Other examples may differ from what is described with regard to FIG. 1.

Figure 2:
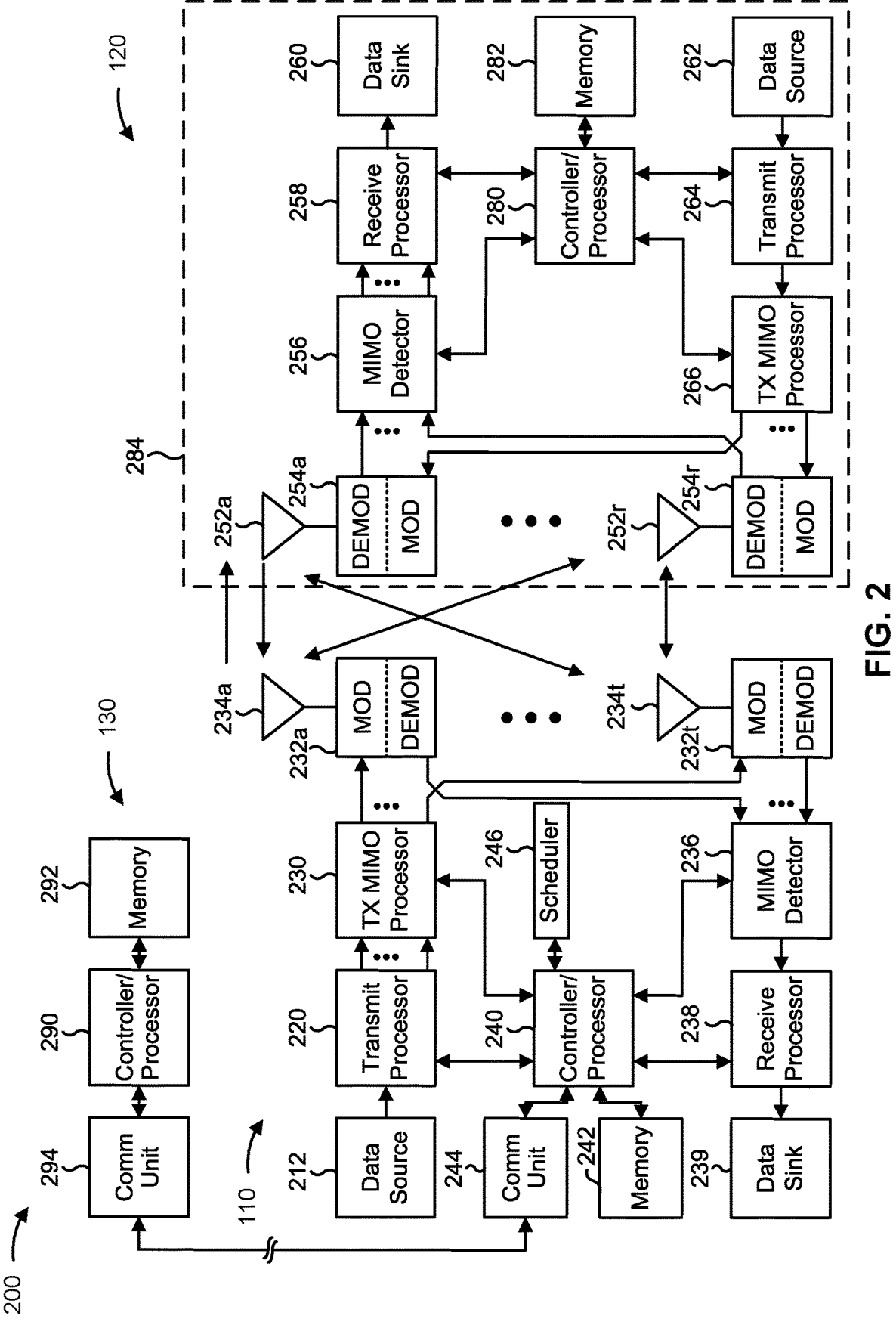
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 6-14).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 6-14).

The controller/processor 240 of the base station 110, the controller/processor 280 of the UE 120, and/or any other component(s) of FIG. 2 may perform one or more techniques associated with a slot level configuration and control message in an open radio access network (O-RAN), as described in more detail elsewhere herein. For example, the controller/processor 240 of the base station 110, the controller/processor 280 of the UE 120, and/or any other component(s) of FIG. 2 may perform or direct operations of, for example, process 1100 of FIG. 11, process 1200 of FIG. 12, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 1100 of FIG. 11, process 1200 of FIG. 12, and/or other processes as described herein. In some examples, executing instructions may include running the instructions, converting the instructions, compiling the instructions, and/or interpreting the instructions, among other examples. In some aspects, the radio unit (RU) described herein is the base station 110, is included in the base station 110, or includes one or more components of the base station 110 shown in FIG. 2. In some aspects, the distributed unit (DU) described herein is the base station 110, is included in the base station 110, or includes one or more components of the base station 110 shown in FIG. 2.

In some aspects, the RU includes means for receiving, from a DU, a control plane message associated with a section type that is dedicated for slot level configuration information, wherein the control plane message includes a common section header that identifies a group of one or more endpoints, and one or more section type commands associated with the common section header, and wherein the one or more section type commands include information associated with a slot level common configuration that applies to the group of one or more endpoints; and/or means for performing at least one of radio frequency configuration or time domain beamforming for the group of one or more endpoints based at least in part on the information included in the one or more section type commands. In some aspects, the means for the RU to perform operations described herein may include, for example, one or more of transmit processor 220, TX MIMO processor 230, modem 232, antenna 234, MIMO detector 236, receive processor 238, controller/ processor 240, memory 242, or scheduler 246.

In some aspects, the DU includes transmitting, to an RU, a control plane message associated with a section type that is dedicated for slot level configuration information, wherein the control plane message includes a common section header that identifies a group of one or more endpoints, and one or more section type commands associated with the common section header, and wherein the one or more section type commands include information associated with a slot level common configuration that applies to the group of one or more endpoints. In some aspects, the means for the DU to perform operations described herein may include, for example, one or more of transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
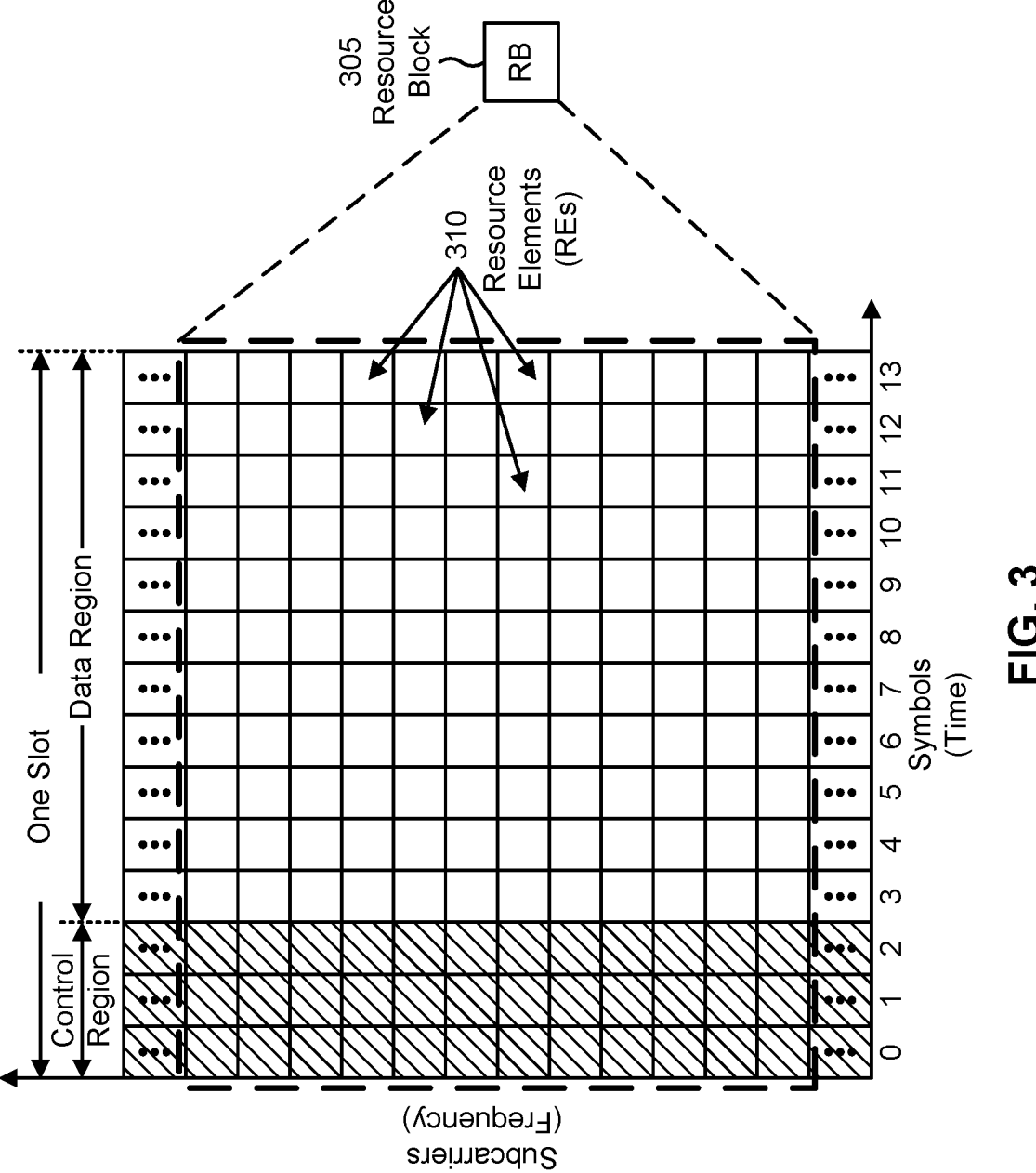
FIG. 3 is a diagram illustrating an example of a slot format, in accordance with the present disclosure.

FIG. 3 is a diagram illustrating an example 300 of a slot format, in accordance with the present disclosure. As shown in FIG. 3, time-frequency resources in a radio access network may be partitioned into resource blocks, shown by a single resource block (RB) 305. An RB 305 is sometimes referred to as a physical resource block (PRB). An RB 305 includes a set of subcarriers (e.g., 12 subcarriers) and a set of symbols (e.g., 14 symbols) that are schedulable by a base station 110 as a unit. In some aspects, an RB 305 may include a set of subcarriers in a single slot. As shown, a single time-frequency resource included in an RB 305 may be referred to as a resource element (RE) 310. An RE 310 may include a single subcarrier (e.g., in frequency) and a single symbol (e.g., in time). A symbol may be referred to as an orthogonal frequency division multiplexing (OFDM) symbol. An RE 310 may be used to transmit one modulated symbol, which may be a real value or a complex value.

In some telecommunication systems (e.g., NR), RBs 305 may span 12 subcarriers with a subcarrier spacing of, for example, 15 kilohertz (kHz), 30 kHz, 60 kHz, or 120 kHz, among other examples, over a 0.1 millisecond (ms) duration. A radio frame may include 40 slots and may have a length of 10 ms. Consequently, each slot may have a length of 0.25 ms. However, a slot length may vary depending on a numerology used to communicate (e.g., a subcarrier spacing and/or a cyclic prefix format). A slot may be configured with a link direction (e.g., downlink or uplink) for transmission. In some aspects, the link direction for a slot may be dynamically configured. As shown in FIG. 3, in some examples, an RB 305 may include a control region and a data region. In 5G/NR, the control region may be an optional control region, and may not be present in all RBs 305. In a case in which the control region is absent in an RB 305, that region can be used for data.

As indicated above, FIG. 3 is provided as an example. Other examples may differ from what is described with respect to FIG. 3.

Figure 4:
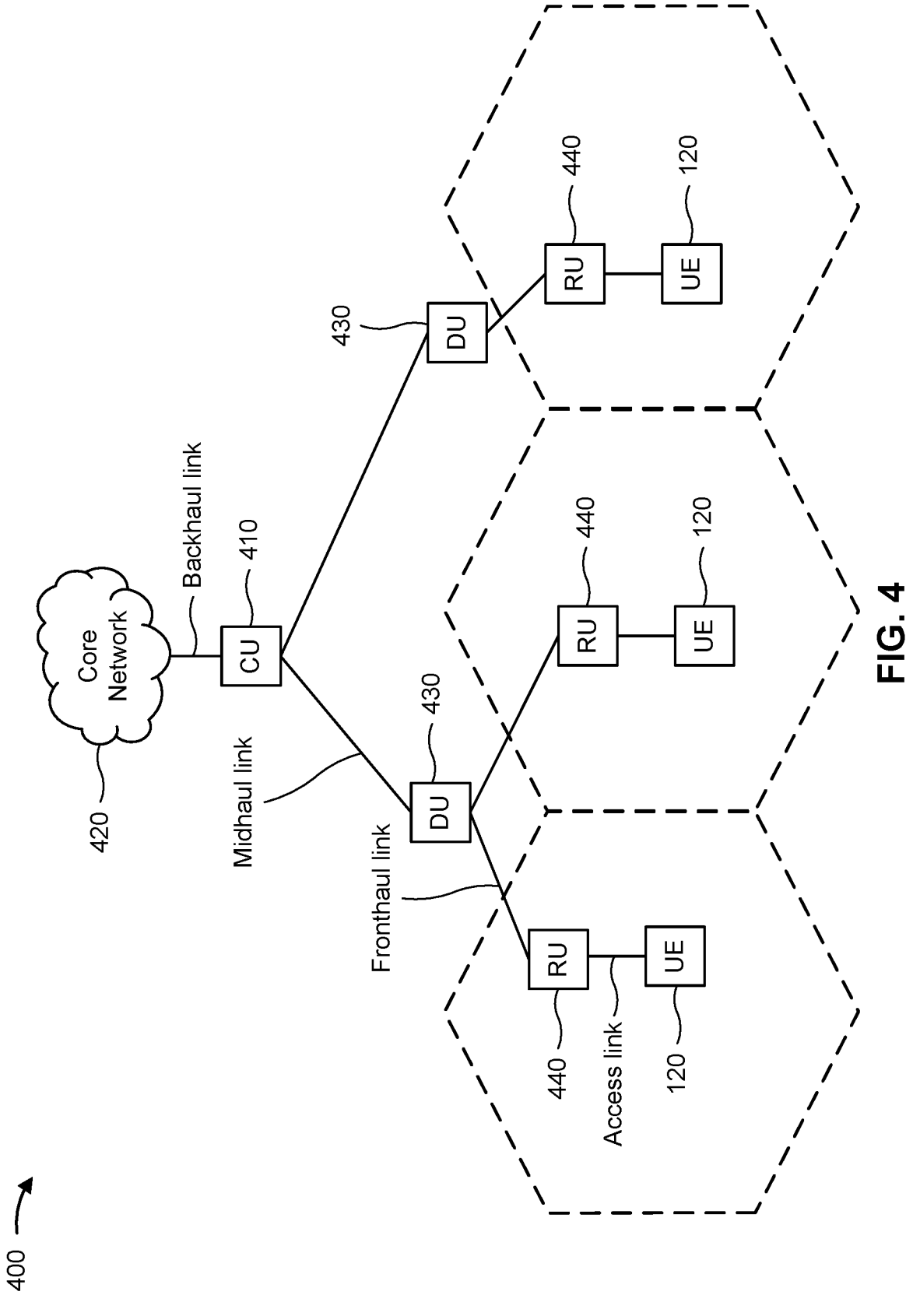
FIG. 4 is a diagram illustrating an example of an open radio access network (O-RAN) architecture, in accordance with the present disclosure.

FIG. 4 is a diagram illustrating an example 400 of an O-RAN architecture, in accordance with the present disclosure. As shown in FIG. 4, the O-RAN architecture may include a control unit (CU) 410 that communicates with a core network 420 via a backhaul link. Furthermore, the CU 410 may communicate with one or more DUs 430 via respective midhaul links. The DUs 430 may each communicate with one or more RUs 440 via respective fronthaul links, and the RUs 440 may each communicate with respective UEs 120 via radio frequency (RF) access links. The DUs 430 and the RUs 440 may also be referred to as O-RAN DUs (O-DUs) 430 and O-RAN RUs (O-RUs) 440, respectively.

In some aspects, the DUs 430 and the RUs 440 may be implemented according to a functional split architecture in which functionality of a base station 110 (e.g., an eNB or a gNB) is provided by a DU 430 and one or more RUs 440 that communicate over a fronthaul link. Accordingly, as described herein, a base station 110 may include a DU 430 and one or more RUs 440 that may be co-located or geographically distributed. In some aspects, the DU 430 and the associated RU(s) 440 may communicate via a fronthaul link to exchange real-time control plane information via a lower layer split (LLS) control plane (LLS-C) interface, to exchange non-real-time management information via an LLS management plane (LLS-M) interface, and/or to exchange user plane information via an LLS user plane (LLS-U) interface.

Accordingly, the DU 430 may correspond to a logical unit that includes one or more base station functions to control the operation of one or more RUs 440. For example, in some aspects, the DU 430 may host a radio link control (RLC) layer, a medium access control (MAC) layer, and one or more high physical (PHY) layers (e.g., forward error correction (FEC) encoding and decoding, scrambling, and/or modulation and demodulation) based at least in part on a lower layer functional split. Higher layer control functions, such as a packet data convergence protocol (PDCP), radio resource control (RRC), and/or service data adaptation protocol (SDAP), may be hosted by the CU 410. The RU(s) 440 controlled by a DU 430 may correspond to logical nodes that host RF processing functions and low-PHY layer functions (e.g., fast Fourier transform (FFT), inverse FFT (iFFT), digital beamforming, and/or physical random access channel (PRACH) extraction and filtering) based at least in part on the lower layer functional split. Accordingly, in an O-RAN architecture, the RU(s) 440 handle all over the air (OTA) communication with a UE 120, and real-time and non-real-time aspects of control and user plane communication with the RU(s) 440 are controlled by the corresponding DU 430, which enables the DU(s) 430 and the CU 410 to be implemented in a cloud-based RAN architecture.

As indicated above, FIG. 4 is provided as an example. Other examples may differ from what is described with regard to FIG. 4.

FIG. 5 is a diagram illustrating an example 500 of a transport header for a message in an O-RAN, in accordance with the present disclosure. As shown in FIG. 5, the transport header may be included in a message transmitted between network nodes in an O-RAN architecture. For example, the transport header may be included in a message transmitted by a DU to an RU or in a message transmitted by an RU to a DU. The transport header may be included in control plane (C-plane) messages, user plane (U-plane) messages, and/or management plane (M-plane) messages. As shown in FIG. 5, the transport header may be an 8 byte transport header. In some aspects, the transport header may be an enhanced common public radio interface (eCPRI) transport header. In some aspects, the transport header may be included within a payload (e.g., an Ethernet payload) of a message.

The transport header may indicate information about a message, such as a message type, transmission source identifiers, destination identifiers, and/or sequence number identifiers. For example, the transport header may indicate eCPRI version information (e.g., an eCPRI protocol version) in an eCPRIVersion field of the transport header (e.g., in bit fields 0-3 of Octet 1). The transport header may include a concatenation indicator in an eCPRIConcatenation field (e.g., in bit field 7 of Octet 1). The concatenation indicator may indicate whether the message is associated with other messages in an eCPRI protocol data unit (PDU) (e.g., the concatenation indicator may indicate if a message is a last message in an eCPRI PDU or if another message follows the message within the eCPRI PDU). As shown in FIG. 5, bit fields 4-6 of Octet 1 of the transport header may be reserved (e.g., not used).

The transport header may include an eCPRIMessage field (e.g., in Octet 2) that indicates a message type associated with the message. For example, the eCPRIMessage field may indicate if a message is a C-plane message or a U-plane message. The transport header may include an eCPRIPayload field (e.g., in Octet 3 and/or Octet 4) that indicates a payload size (e.g., in bytes) of the message.

The transport header may include a field that indicates message source information and message destination information in Octet 5 and/or Octet 6. For example, if the message is a C-plane message, the message source information and the message destination information may be included in an eCPRIRtcid field. If the message is a U-plane message, the message source information and the message destination information may be included in an eCPRIPcid field. The message source information and the message destination information may be indicated by an extended antenna-carrier (eAxC) identifier that indicates eAxC information. For example, the eAxC information indicated by the eAxC identifier may include a transmitting device port identifier, a band sector identifier, a transmitting antenna identifier, a component carrier identifier, a receiving device port identifier, a receiving antenna identifier, an indication of a MIMO spatial steam, and/or an indication of a MIMO layer, among other examples. An eAxC identifier may indicate a particular logical spatial stream of data, which may be referred to as an "endpoint." The transport header may include an eCPRISeqID field (e.g., in Octet 7 and/or Octet 8) that indicates a sequence identifier associated with the message.

As indicated above, FIG. 5 is provided as an example. Other examples may differ from what is described with regard to FIG. 5.

A DU may transmit C-plane messages to an RU via a fronthaul interface. In some examples, C-plane messages may be encapsulated using a two-layer header approach. A first layer may include an eCPRI header, which may include fields to indicate the message type. A second layer may be an application layer that includes fields for control and synchronization. Within the application layer, a "section" defines characteristics of U-plane data to be transmitted or received by the RU using a beam with an associated pattern identifier. Various section types are defined for the sections in the application layer, and a structure of the C-plane message may be different for different section types. In some cases, section types (e.g., section type 0, section type 1, and/or section type 3, among other examples) in the O-RAN fronthaul interface standard are designed to provide information on a per eAxC (e.g., per spatial layer) and a per RB (or group of RBs) basis. Such section types may be well-suited for some information, such as digital beamforming information, that can change on a per RB or per spatial layer basis. However, some information, such as analog beamforming information, time domain duplex (TDD) configuration, and/or idle or guard periods, may apply to a group of carriers or band sectors. For example, such information may apply to all RBs and spatial layers in a group of carriers or band sectors. Repeating transmission of such information on a per RB and per spatial layer basis may utilize a large amount of C-plane signaling overhead, which may increase processing time for the RU and reduce network speed.

In some cases, it may be possible to enforce additional restrictions on an existing defined section type (e.g., a restriction that the number of RBs indicated in a section header associated with the section type is equal to 0) and enforce usage of one or more extensions (e.g., extension type 7) to transmit information that applies to all RBs and/or all eAxCs. However, in this case, the RU may not be able to determine, from a quick inspection, that a packet (e.g., C-plane message) includes the information that applied to all RBs and/or all eAxCs. Instead, the RU may be required to process every packet (e.g., every C-plane message) in a C-plane reception window in order to extract the relevant information. In this case, the RU may not be able to prioritize processing the information that applies to all RBs and/or all eAxCs early in the C-plane processing window, which may prevent any reduction of processing time for beamforming by the RU using the information.

Some techniques and apparatuses described herein enable a DU to transmit, to an RU, a C-plane message associated with a section type that is dedicated for slot level configuration information. The C-plane message may include a common section header and one or more section type commands associated with the common section header. The common section header may identify a group of one or more endpoints (e.g., a group of one or more eAxCs). The one or more section type commands may include information associated with a slot level common configuration that applies to the group one or more endpoints identified in the common section header (e.g., for all RBs in a slot). The RU may receive the C-plane message including the common section header and the one or more section type commands, and the RU may perform at least one of RF configuration or time domain beamforming for the group of one or more endpoints based at least in part on the information included in the one or more section type commands. As a result, the C-plane signaling overhead for providing the information to the RU may be reduced. In addition, the RU may prioritize C-plane messages associated with the section type that is dedicated for information that applies to all RBs and spatial layers in a group of carriers or band sectors, which may reduce processing time for the beamforming performed by the RU.

Further, the use of the common section header and the section type commands for the control plane message associated with the section type may provide increased flexibility and reduced C-plane signaling overhead, as compared with including all configuration information for the slot level common configuration in the section header. For example, the DU may use different section type commands to configure different information in the slot level common configuration for different groups of endpoints. In this case, the amount of C-plane signaling overhead used may vary based at least in part on which section type commands are included in the C-plane message.

Beamforming is a technique in which an array of antenna elements is used to transmit radio signals in a specific beam direction or receive radio signals from a specific beam direction. In some examples, an RU may use hybrid beamforming, which combines analog beamforming and digital beamforming. In this case, a DU may specify analog beam information, along with digital beam information, on a per RB and per spatial layer basis. However, while digital beams may change on a per RB and per spatial layer basis, analog beams are wideband and apply to all RBs and all spatial layers for a carrier. Accordingly, the same analog beam information may be repeated numerous times with the digital beam information, leading to significant signaling overhead. Furthermore, in order for an RU to extract the analog beam information for a symbol, the RU may be required to process all of the digital beams within a carrier. For example, in some cases, there may be approximately 4000 digital beams per carrier.

In some aspects described herein, a DU may transmit, to an RU, a C-plane message associated with the section type that is dedicated for slot level configuration information, and the C-plane message may include a section type command that includes a slot level configuration for time domain beam information that applies to a group of one or more endpoints. As a result, the DU can provide time domain beam information (e.g., time domain analog beam information) for a slot in a single message, thereby reducing C-plane signaling overhead and reducing processing time needed for the RU to process the analog beam information.

Figure 6:
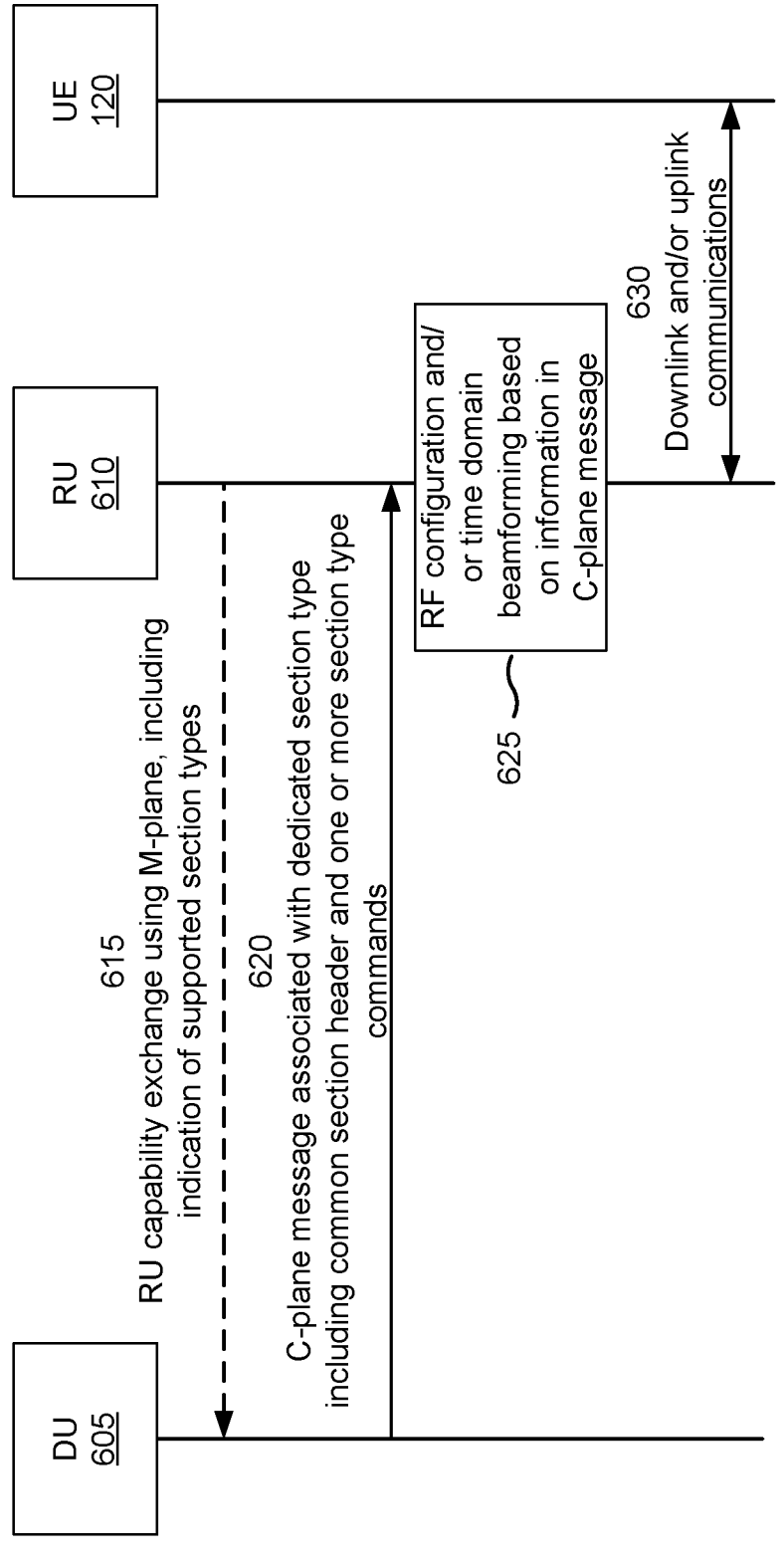

FIG. 6 is a diagram illustrating an example 600 associated with a slot level configuration and control message in an O-RAN, in accordance with the present disclosure. As shown in FIG. 6, example 600 includes communication between a DU 605, an RU 610, and a UE 120. In some aspects, the DU 605 and the RU 610 may be included in an O-RAN architecture. For example, the DU 605 may be similar to DU 430 described above in connection with FIG. 4, and the RU 610 may be similar to RU 440 described above in connection with FIG. 4. The DU 605 and the RU 610 may communicate via a fronthaul link (e.g., via a fronthaul interface). The RU 610 and the UE 120 may communicate via a wireless access link, which may include an uplink and a downlink.

As shown in FIG. 6, and by reference number 615, in an RU capability exchange using the M-plane, the RU 610 may transmit, to the DU 605, an indication of supported section types. For example, the RU 610 may transmit, to the DU 605, an M-plane message including the indication of supported section types. The DU 605 may receive the M-plane message transmitted by the RU 610. The M-plane message may indicate section types that are supported by the RU 610. In some aspects, the M-plane message may indicate whether the RU 610 supports a section type that is dedicated to slot level configuration information. For example, the section type may be dedicated to slot level configuration information that applies to a single endpoint (e.g., eAxC) or a group of endpoints. In some aspects, the section type that is dedicated to slot level configuration information may be associated with an index used to identify messages associated with the section type. For example, this section type may be associated with an index of 8 (e.g., section type 8) or another index value. Hereinafter, the section type that is dedicated to slot level configuration information may be referred to as the "dedicated section type" or "section type 8."

In some aspects, the M-plane message may indicate whether the dedicated section type is supported on a per endpoint basis, for one or more endpoints associated with the RU 610. In this case, the M-plane message may also indicate, for each endpoint that supports the dedicated section type (e.g., section type 8), one or more supported command types that are associated with the dedicated section type. A plurality of command types may be associated with the dedicated section type, with each command type corresponding to a type of information that may be configured in a slot level common configuration by a command included in a control plane message of the dedicated section type. For example, the command types associated with the dedicated section type may include a TDD configuration command type, an idle pattern configuration command type, a TDD and idle pattern configuration command type, and a hybrid beamforming time domain beam configuration command type. The RU 610 may indicate, in the M-plane message, which of the command types associated with the dedicated section type are supported for each endpoint that supports the dedicated section type.

In some aspects, the M-plane message may include an indication relating to a capability of the RU 610 (e.g., on a per endpoint basis) for receiving a control plane message of the dedicated section type that includes a slot level common configuration. For example, the RU 610 may include, in the M-plane message, an indication of how often the RU 610 is capable of receiving a control plane message of the dedicated section type that includes a slot level common configuration. In some aspects, the DU 605 may use this indication of the capability of the RU 610 to schedule transmission of control plane messages of the dedicated section type to the RU 610 in scenarios, such as mini-slot scenarios, in which the slot size can vary.

As further shown in FIG. 6, and by reference number 620, the DU 605 may transmit, to the RU 610, a C-plane message that includes information associated with a slot level configuration that applies to a group of one or more endpoints. The slot level configuration may apply to all RBs in a slot, for each endpoint in the group of one or more endpoints. The RU 610 may receive the C-plane message transmitted by the DU 605. In some aspects, the C-plane message may be associated with the dedicated section type (e.g., section type 8). As described above, the dedicated section type is dedicated to slot level configuration information.

The C-plane message associated with the dedicated section type may include a common section header and one or more section type commands associated with the common section header. The common section header may be information that applies to all of the one or more section type commands associated with the common section header. The common section header may identify a group of carriers or band sectors to which the one or more section type commands apply. The one or more section type commands may include information associated with a slot level common configuration that applies to all resource blocks and spatial layers in the group of carriers or band sectors identified in the common section header. A plurality of command types may be associated with the dedicated section type, with each command type corresponding to a type of information that may be configured in a slot level common configuration. Each of the one or more section type commands included in the C-plane message may be associated with a respective command type of the plurality of command types associated with the dedicated section type. The command based structure for the C-plane message associated with the dedicated section type may provide an extendable slot level C-plane messaging framework, in which different section type commands may be used to indicate different slot level configuration information.

The C-plane message associated with the dedicated section type may include a transport header, in addition to the common section header and the one or more section type commands. The transport header may be an eCPRI transport header, such as the eCPRI transport header described above in connection with FIG. 5. In some aspects, the transport header may include an indication of an eAxC identifier.

The common section header may indicate the group of one or more endpoints to which the information in the one or more section type commands applies. In some aspects, the common section header may include an eAxC sub-field mask that identifies the indicated group of one or more endpoints to which the information in the one or more section type commands applies. The eAxC sub-field mask may include a plurality of bits that are associated with respective sub-fields of the eAxC identifier, and each bit of the eAxC sub-field mask may indicate whether the group of one or more endpoints identified by the eAxC sub-field mask is based at least in part on the respective sub-field of the eAxC identifier indicated in the transport header. For example, each bit of the eAxC sub-field mask may indicate whether the group of one or more endpoints includes endpoints associated with all possible values covered by the respective sub-field, or includes only endpoints associated with a specific indexed value of the respective sub-field in the eAxC identifier included in the transport header. For each bit of the eAxC sub-field mask, a first value (e.g., 0) may indicate that the section description (e.g., the information in the section type commands) applies to all possible values covered by the respective sub-field of the eAxC identifier, and a second value (e.g., 1) may indicate that the section description (e.g., the information in the section type commands) applies to the indexed value of the respective sub-field of the eAxC identifier indicated in the transport header.

In some aspects, the eAxC sub-field mask may include four bits. For example, the eAxC sub-field mask may include a first bit associated with a DU port identifier sub-field of the eAxC identifier, a second bit associated with a band sector identifier sub-field of the eAxC identifier, a third bit associated with a CC identifier sub-field of the eAxC identifier, and a fourth bit associated with a RU port identifier sub-field of the eAxC identifier. In this case, a value of 0 for all four bits in the eAxC sub-field mask (e.g., 0000) may provide an indication that the section description applies to all CCs, band sectors and layers (e.g., the group of one or more endpoints includes all endpoints and is not based at least in part on the sub-fields of the eAxC identifier indicated in the transport header). A value of 1 for the third bit (e.g., the CC identifier bit) and a value of 0 for the other bits (e.g., 0010) may provide an indication that the section description applies to all band sectors and all layers, but only applies to a carrier associated with the CC identifier indicated in the CC identifier sub-field of the eAxC identifier included in the transport header. A value of 1 for the second bit (e.g., the band sector identifier bit) and a value of 0 for the other bits (e.g., 0100) may provide an indication that the section description applies to a band sector associated with the band sector identifier indicated in the band sector identifier sub-field of the eAxC identifier included in the transport header, and applies to all CCs and layers. A value of 1 for the second bit (e.g., the band sector identifier bit) and the third bit (e.g., the CC identifier bit) and a value of 0 for the other bits (e.g., 0110) may provide an indication that the section description applies to all layers, but only applies to the band sector indicated by the band sector identifier sub-field of the eAxC identifier included in the transport header and the CC indicated in the CC identifier sub-field of the eAxC identifier included in the transport header. A value of 1 for the second bit (e.g., the band sector identifier bit) and the fourth bit (e.g., the RU port identifier bit) and a value of 0 for the other bits (e.g., 0101) may provide an indication that the section description applies to a specific RU port indicated in the RU port identifier sub-field of the eAxC identifier included in the transport header, for all CCs in the band sector indicated by the band sector identifier sub-field of the eAxC identifier included in the transport header. For example, the section description may apply only to PRACH in all component carriers in the indicated band sector. A value of 1 for the first bit (e.g., the DU port identifier bit) and a value of 0 for the other bits may provide an indication that the section description applies to all band sectors and component carriers for a specific DU port indicated in the DU port identifier sub-field of the eAxC identifier included in the transport header. For example, the different DU ports may be used for LTE communications and NR communications.

In some aspects, the common section header may indicate a slot to which the information included in the one or more section type commands (e.g., the slot level common configuration information) applies. For example, the common section header may include an indication of a frame identifier, a sub-frame identifier, and a slot identifier. In some aspects, the common section header may indicate subcarrier spacing to which the slot level common configuration information in the one or more section type commands applies. In some aspects, the common section header may indicate a start symbol value. The start symbol value indicates a start symbol, of the indicated slot, at which to begin applying the slot level common configuration information included in the one or more section type commands. For example, the information included in the one or more section type commands may apply from the start symbol of the slot indicated in the common section header to a last symbol of the slot indicated in the common section header. In some aspects, the common section header may include an indication that the section type is the dedicated section type (e.g., section type 8). The common section header may also indicate a quantity of section type commands that are included in the C-plane message. The common section header associated with the dedicated section type is depicted and described in more detail below in connection with FIG. 7.

In some aspects, the one or more section type commands included in the C-plane message may include one or more of a TDD configuration command, an idle symbol pattern configuration command, a TDD and idle symbol pattern configuration command, or a time domain beam configuration command. Each section type command may include an indication of the command type and an indication of the command length for the section type command.

In some aspects, the TDD configuration command may indicate a TDD configuration that applies to all RBs and spatial layers in the group of carriers or band sectors indicated in the section header. For example, the TDD configuration command may include an indication of a direction pattern for the symbols in a slot (or a subset of the symbols in the slot indicated by the symbol mask) that provides the TDD configuration. In this case, the direction pattern may indicate a slot level common configuration for a pattern of downlink and uplink symbols. For example, the direction pattern may indicate a respective direction (e.g., downlink or uplink) associated with each symbol in the slot. In some aspects, the TDD configuration command may also indicate a slot level common configuration for a pattern of guard symbols. For example, the pattern of guard symbols may indicate which symbols in the slot are configured as guard symbols (e.g., between uplink and downlink symbols). Guard symbols are symbols that provide gaps for the UE 120 to switch between uplink transmission and downlink reception. The TDD configuration command is depicted and described in more detail below in connection with FIG. 9.

In some aspects, the idle symbol pattern configuration command may indicate a slot level common configuration of idle and active information symbols. Idle symbols are symbols configured such that data is not exchanged on those symbols, which allows a device (e.g., a UE) to remain in an idle state. An active symbol is a symbols on which data may be exchanged. Configuring a pattern of idle symbols in a slot, a device (e.g., a UE) to avoid unnecessary transitions from and idle state, and may result in power savings. In some aspects, the idle symbol pattern configuration command may indicate, for each symbol in the slot, whether that symbol is idle or active. The idle symbol pattern configuration command is depicted and described in more detail below in connection with FIG. 10.

In some aspects, the TDD and idle symbol pattern configuration command may indicate the slot level TDD configuration (e.g., the direction pattern) for the symbols in the slot and the slot level common configuration of idle and active symbols in the slot. The TDD and idle pattern may also indicate the pattern of guard symbols in the slot.

In some aspects, the time domain beam configuration command may indicate time domain beam information for hybrid beamforming. For example, the time domain beam information may be time domain analog beam information. In hybrid beamforming, a hybrid beam identifier may indicate a composite beamforming vector including a frequency domain weight vector and a time domain weight vector. In some aspects, the DU 605 may decouple the frequency domain beam information and the time domain beam information for hybrid beamforming, and the DU 605 may transmit the frequency domain beam information and the time domain beam information to the RU 610 using separate control plane messages associated with different section types. In some aspects, the DU 605 may transmit PRB level frequency domain beamforming weight updates, and the DU 605 may transmit a slot level configuration for the time domain beam beamforming weight using the time domain beam configuration command in the C-plane message associated with the dedicated section type. The time domain beam configuration command may include an indication of a time domain beam group identifier that identifies a group of time domain beams. The time domain time domain beam configuration command may include a respective time domain beam identifier and respective time domain beamforming weights associated with each time domain beam of the group of time domain beams. The time domain beam configuration command is depicted and described in more detail below in connection with FIG. 8.

As further shown in FIG. 6, and by reference number 625, the RU 610 may perform RF configuration and/or time domain beamforming for one or more communications with the UE 120 based at least in part on the information included in the C-plane message received from the DU 605. For example, the RU 610 may perform time domain beamforming, RF processing, and/or low-PHY downlink/uplink processing based at least in part on the slot level configuration information. In some aspects, the RU 610 may configure an RF portion (e.g., RF circuitry) of the RU 160 for downlink and/or uplink communications in a slot based at least in part on the slot level configuration information included in the C-plane message. For example, the RU 610 may configure time domain beamforming coefficients and/or configure the state of Tx or Rx for the RF portion (e.g., RF circuitry) of the RU 610 based at least in part on the slot level configuration information. In some aspects, the RU 610 may perform the RF configuration in accordance with a slot level TDD configuration indicated in the TDD configuration command and/or a slot-level idle and active pattern configuration indicated in the idle symbol pattern configuration command. Additionally, or alternatively, the RU 610 may perform the time domain beamforming based at least in part on the time domain beam information indicated in the time domain beam configuration command. For example, the RU 610 may use the slot level common configurations indicated in the one or more section type commands in the RF configuration and/or time domain beamforming for all of the endpoints in the indicated group of one or more endpoints identified in the common section header.

In some aspects, the RU 610 may route the C-plane message associated with the dedicated section type to RF circuitry, such as an RF integrated circuit (RFIC), to perform the RF configuration and/or low-PHY processing. In some aspects, the RU 610 may route the C-plane message associated with the dedicated section type to a non-beamforming processor in the RU 610. For example, the non-beamforming processor may be RF circuitry, such as an RFIC.

In some aspects, the RU 610 may perform hybrid beamforming using the time domain beamforming information indicated in the hybrid beamforming time domain beam configuration command for a carrier (or group of carriers) for all RBs and spatial layers in that carrier (or group of carriers). In this case, the RU 610 may combine the time domain beamforming information for the RBs and spatial layers in that carrier with digital beamforming information that is indicated (e.g., in other C-plane messages) on a per RB and per endpoint basis.

In some aspects, the RU 610 may prioritize C-plane messages associated with the dedicated section type (e.g., as compared with C-plane messages associated with other section types). For example, the RU 610 may prioritize processing C-plane messages associated with the dedicated section type over other C-plane messages received in a C-plane reception window. This enables the RU 610 to determine the slot level common configuration information that applies to a group of one or more endpoints early in the slot processing timeline, which may save processing time for the RU 610 to perform the RF configuration and/or time domain beamforming using the slot level common configuration information.

In some aspects, the DU 605 may transmit other messages (e.g., other C-plane messages associated with other section types) to the RU 610 that include additional information related to beamforming. In this case, the RU 610 may perform beamforming based at least in part on the C-plane message associated with the dedicated section type and the information included in one or more other messages (e.g., other C-plane messages) received from the DU 605.

As further shown in FIG. 6, and by reference number 630, the RU 610 may transmit one or more downlink communications to the UE 120 and/or receive one or more uplink communications from the UE 120 based at least in part on the RF configuration and/or time domain beam forming. For example, the RU 610 may transmit one or more downlink communications to the UE 120 using one or more Tx beams based at least in part on the RF configuration and the time domain beamforming. Additionally, or alternatively, the RU 610 may receive one or more uplink communications using one or more Rx beams based at least in part on the RF configuration and the time domain beamforming. The UE 120 may receive the one or more downlink communications from the RU 610 and/or transmit the one or more uplink communications to the RU 610 using Rx and/or Tx beams corresponding to the Tx and/or Rx beams used by the RU 610.

As indicated above, FIG. 6 is provided as an example. Other examples may differ from what is described with respect to FIG. 6.

FIG. 7 is a diagram illustrating an example 700 associated with a slot level configuration and control message in an O-RAN, in accordance with the present disclosure. As shown in FIG. 7, example 700 shows an example of a structure of a C-plane message associated with a section type that is dedicated for slot level configuration information (e.g., the "dedicated section type" or "section type 8"). In some aspects, the dedicated section type may be used for a slot level common configuration that applies to all RBs and spatial layers in an indicated group of carriers or band sectors and/or a slot level common configuration that applies to a single endpoint.

As shown in FIG. 7, the C-plane message associated with the dedicated section type may include a transport header 705 and a common section header 710 associated with the dedicated section type. In some aspects, the transport header 705 may be an eCPRI transport header, such as the eCPRI transport header described above in connection with FIG. 5. The common section header 710 may include a field (sectionType) that indicates the section type for the C-plane message. For example, the section type field may indicate that the section type is the dedicated section type (e.g., sectionType=8). The common section header 710 may also include a field (numberOfSecType8Cmds) that indicates a quantity of section type commands included in the C-plane message (e.g., a quantity of section type commands associated with the common section header 710). The common section header 710 may also include fields that indicate a data direction, a payload version, a frame ID, subframe IDs, a slot ID, a start symbol ID, and a subcarrier spacing (scs).

The common section header 710 may indicate the group of carriers or band sectors to which the information in the common section header 710 and the one or more section type commands associated with the common section header 710 (e.g., the section description) applies. As shown in FIG. 7, the common section header 710 may include a field for an eAxC sub-field mask (eAxCSubFieldMask) that identifies the indicated group of one or more endpoints to which the section description applies. In some aspects, the eAxC sub-field mask may be four bits, and each bit of the eAxC sub-field mask may be associated with a respective sub-field of an eAxC identifier included in the transport header 705. For each bit of the eAxC sub-field mask, a first value (e.g., 0) may indicate that the section description applies to endpoints associated with all possible values covered by the respective sub-field of the eAxC identifier, and a second value (e.g., 1) may indicate that the section description applies to endpoints associated with the indexed value of the respective sub-field of the eAxC identifier indicated in the transport header 705. In some aspects, a first bit of the eAxC sub-field mask may be associated with a DU port identifier sub-field of the eAxC identifier, a second bit of the eAxC sub-field mask may be associated with a band sector identifier sub-field of the eAxC identifier, a third bit of the eAxC sub-field mask may be associated with a CC identifier sub-field of the eAxC identifier, and a fourth bit of the eAxC sub-field mask may be associated with a RU port identifier sub-field of the eAxC identifier.

As indicated above, FIG. 7 is provided as an example. Other examples may differ from what is described with respect to FIG. 7.

FIG. 8 is a diagram illustrating an example 800 associated with a slot level configuration and control message in an O-RAN, in accordance with the present disclosure. As shown in FIG. 8, example 800 shows an example of a C-plane message associated with the dedicated section type (e.g., section type 8) that includes a section type command associated with a slot level common configuration of time domain beam information for hybrid beamforming.

As shown in FIG. 10, the C-plane message may include a transport header 805, a common section header 810 associated with the dedicated section type (e.g., section type 8), and a time domain beam configuration command 815 associated with the dedicated section type (e.g., section type 8). In some aspects, the transport header 805 may be an eCPRI transport header, such as the eCPRI transport header described above in connection with FIG. 5. In some aspects, the common section header 810 may be the common section header 710 described above in connection with FIG. 7.

In some aspects, the DU 605 may decouple frequency domain beam information and time domain beam information for hybrid beamforming, and the DU 605 may transmit the frequency domain beam information and the time domain beam information to the RU 610 using separate control plane messages associated with different section types. In some aspects, the DU 605 may transmit the frequency domain beam information to the RU 610 using section type and section extensions that are available to provide PRB level frequency domain beamforming weight updates, and the DU 605 may transmit a slot level configuration for the time domain beam information using the time domain beam configuration command 815 in the C-plane message associated with the dedicated section type. For example, as shown in FIG. 8, the time domain beam configuration command 815 may indicate a slot level configuration (e.g., slot level updates) for time domain beamforming weights to be used by the RU 610 for hybrid beamforming.

As shown in FIG. 8, the time domain beam configuration command 815 may include a field (secType8CmdType[3:0]) that indicates a command type. In some aspects, the command type indication may be an index value that identifies the command type among a plurality of command types associated with the dedicated section type. For example, secType8CmdType[3:0]=1 may indicate that the command type is a time domain beam configuration command type. The time domain beam configuration command 815 may include a field (secType8CmdLen[0:7] and secType8CmdLen[8:15]) that indicates a command length of the time domain beam configuration command 815. For example, the length of the time domain beam configuration command 815 may be variable based at least in part on a number of time domain beam identifiers for which the slot level configuration is indicated in the time domain beam configuration command 815.

The time domain beam configuration command 815 may include a symbol mask field (symMask) that identifies the symbols in a slot for which the time domain analog beamforming information included in the time domain beam configuration command 815 applies. For example, the symbol mask field may include 14 bits (e.g., symMask [7:0] and symMask [13:8]), and each bit may provide an indication of whether the time domain analog beamforming information applies to a respective symbol in the slot. In some aspects, bits associated with symbols prior to the start symbol indicated in the common section header 810 may be set to 0 (e.g., to indicate that the beamforming information does not apply) by the DU.

The time domain beam configuration command 815 may include a disable beamforming weights field (disableBFWs) that indicates whether or not beamforming weights are included in the time domain beam configuration command 815. The disable beamforming weights field may be set to a first value (e.g., 0) to indicate that time domain beam identifiers with associated beamforming weight values are included in the time domain beam configuration command 815, or a second value (e.g., 1) to indicate that only time domain beam identifiers are included in the time domain beam configuration command 815 without associated beamforming.

The time domain beam configuration command 815 may include a time domain beam group identifier field (tdBeamGrpId) that indicates a time domain beam group identifier that identifies a set of time domain beam identifiers. For example, the time domain beam group identifier may uniquely identify a time domain beam identifier vector of size K'. Each of the K' values in the time domain beam identifier vector may be a respective time domain beam identifier associated with a respective time domain beam. The time domain beam configuration command 815 may include a field (numAntElements) that indicates a number (K) of antenna elements in an antenna array for generating the time domain beams. The time domain beam configuration command 815 may include a field (numTdBeams) that indicates the number (K') of time domain beams for which the slot level time domain beam configuration is indicated in the time domain beam configuration command 815. For example, the numTdBeams field may indicate the size (K') of the time domain beam identifier vector identified in the time domain beam group identifier field.

In some aspects, the time domain beam configuration command 815 may include a beamforming weight compression header field (bfwCompHdr) for indicating a beamforming weight compression header. For example, the time domain beam configuration command 815 may include the beamforming weight compression header field (bfwCompHdr) only in a case in which the disable beamforming weights field indicates that the time domain beamforming weights are present (e.g., disableBFWs=0). In cases in which the disable beamforming weights field indicates that the time domain beamforming weights are not present (e.g., disableBFWs=1), this field may be a reserved field.

As further shown in FIG. 8, the time domain beam configuration command 815 may include time domain beam identifier fields (e.g., tdBeamId0-tdBeamIdN) that provide respective indications of the K' time domain beam identifiers associated with the time domain beam group identifier. For each time domain beam identifier (e.g., tdBeamId0-tdBeamIdN), the time domain beam configuration command 815 may include a respective beamforming weight compression parameter field (bfwCompParam), and a respective set of fields for indicating time domain (e.g., analog) beamforming weights for the set of antenna elements. In some aspects, the time domain beam configuration command 815 may include the beamforming weight compression parameter field and the fields for indicating the time domain beamforming weights only in the case in which the disable beamforming weights field indicates that the time domain beamforming weights are present (e.g., disableBFWs=0). The beamforming weight compression parameter field may indicate a beamforming weight compression parameter for performing compression of the beamforming weights.

The fields for indicating the time domain beamforming weights may include one or more in-phase beamforming weight fields (bfwI) for indicating a respective time domain beamforming weight in-phase value for each of K transceivers (TRXs) associated with respective antenna elements of the antenna array. The fields for indicating the time domain beamforming weights (e.g., analog beamforming weights) may also include one or more quadrature-phase beamforming weight fields (bfwQ) for indicating a respective time domain beamforming weight in-phase value for each of the K transceivers associated with the respective antenna elements of the antenna array. In some aspects, when the time domain weights are present (e.g., disableBFWs=0), the zero padding may be performed by the DU to a 4 byte boundary for each set of weights included (e.g., for a respective time domain beam identifier) in the time domain beam configuration command 815. In some aspects, when the time domain weights are not present (e.g., disableBFWs=1), zero padding may be performed by the DU to a 4 byte boundary only after the last time domain beam identifier included in the time domain beam configuration command 815.

As indicated above, FIG. 8 is provided as an example. Other examples may differ from what is described with respect to FIG. 8.

FIG. 9 is a diagram illustrating an example 900 associated with a slot level configuration and control message in an O-RAN, in accordance with the present disclosure. As shown in FIG. 9, example 900 shows an example of a C-plane message associated with the dedicated section type (e.g., section type 8) that includes a section type command associated with a slot level TDD configuration.

As shown in FIG. 9, the C-plane message may include a transport header 905, a common section header 910 associated with the dedicated section type (e.g., section type 8), and a TDD configuration command 915 associated with the dedicated section type (e.g., section type 8). In some aspects, the transport header 905 may be an eCPRI transport header, such as the eCPRI transport header described above in connection with FIG. 5. In some aspects, the common section header 910 may be the common section header 710 described above in connection with FIG. 7. In some aspects, the start symbol field in the common section header 910 may be set to 0 in a case in which the C-plane message includes the TDD configuration command 915.

In some aspects, the TDD configuration command 915 may be used for dynamic slot level TDD configurations. The TDD configuration command 915 may include a field (secType8CmdType[3:0]) that indicates a command type. In some aspects, the command type indication may be an index value that identifies the command type among a plurality of command types associated with the dedicated section type. For example, secType8CmdType[3:0]=2 may indicate that the command type is a TDD configuration command type. The TDD configuration command 915 may include a field (secType8CmdLen[0:7] and secType8CmdLen[8:15]) that indicates a command length of the TDD configuration command 915. For example, secType8CmdLen=2 may indicate that the length of the TDD command is 8 bytes (e.g., 2 words).

The TDD configuration command 915 may indicate a slot level TDD configuration that applies to all endpoints in the group of endpoints indicated in the common section header 910. As shown in FIG. 9, the TDD configuration command 915 may include a direction pattern field (dirPattern) that indicates the TDD configuration for the symbols in a slot. In this case, the direction pattern field may include 14 bits (e.g., dirPattern [7:0] and dirPattern [13:8]) that indicate respective directions (e.g., downlink or uplink) for the symbols in a slot. Each bit in the direction pattern field may indicate Tx/Rx direction for a respective symbol in the slot. For example, a first bit value (e.g., 1) may be used to indicate a downlink symbol, and a second bit value (e.g., 0) may be used to indicate an uplink symbol.

In some aspects, the TDD configuration command 815 may also include a guard pattern field (guardPattern) that indicates a pattern of guard symbols for a slot. In this case, the guard pattern field may include 14 bits (e.g., guardPattern [7:0] and guardPattern [13:8]) that indicate whether respective symbols in the slot are guard symbols or not. For example, a first bit value (e.g., 1) may be used to indicate that a symbol is a guard symbol, and a second bit value (e.g., 0) may be used to indicate that a symbol is not a guard symbol.

As indicated above, FIG. 9 is provided as an example. Other examples may differ from what is described with respect to FIG. 9.

FIG. 10 is a diagram illustrating an example 1000 associated with a slot level configuration and control message in an O-RAN, in accordance with the present disclosure. As shown in FIG. 10, example 1000 shows an example of a C-plane message associated with the dedicated section type (e.g., section type 8) that includes a section type command associated with a slot level idle symbol pattern configuration.

As shown in FIG. 10, the C-plane message may include a transport header 1005, a common section header 1010 associated with the dedicated section type (e.g., section type 8), and an idle symbol pattern configuration command 1015 associated with the dedicated section type (e.g., section type 8). In some aspects, the transport header 1005 may be an eCPRI transport header, such as the eCPRI transport header described above in connection with FIG. 5. In some aspects, the common section header 1010 may be the common section header 710 described above in connection with FIG. 7.

In some aspects, the idle symbol pattern configuration command 1015 may be used for slot level idle symbol pattern configurations for power saving and/or transmission blanking. The idle symbol pattern configuration command 1015 may include a field (secType8CmdType[3:0]) that indicates a command type. In some aspects, the command type indication may be an index value that identifies the command type among a plurality of command types associated with the dedicated section type. For example, secType8CmdType[3:0]=3 may indicate that the command type is an idle symbol pattern configuration command type. The idle symbol pattern configuration command 1015 may include a field (secType8CmdLen[0:7] and secType8CmdLen[8:15]) that indicates a command length of the idle symbol pattern configuration command 1015. For example, secType8CmdLen=2 may indicate that the length of the idle symbol pattern configuration command 1015 is 8 bytes (e.g., 2 words).

The idle symbol pattern configuration command 1015 may indicate a slot level idle symbol pattern configuration that applies to all endpoints in the group of one or more endpoints indicated in the common section header 1010. As shown in FIG. 10, the idle symbol pattern configuration command 1015 may include an idle pattern field (idlePattern) that indicates of a pattern of idle and active symbols for the symbols in a slot. In this case, the idle pattern field may include 14 bits (e.g., idlePattern [7:0] and idlePattern [13:8]) that provide respective indications of idle or active for the symbols in the slot. For example, a first bit value (e.g., 1) may be used to indicate an idle symbol, and a second bit value (e.g., 0) may be used to indicate an active symbol.

As indicated above, FIG. 10 is provided as an example. Other examples may differ from what is described with respect to FIG. 10.

FIG. 11 is a diagram illustrating an example process 1100 performed, for example, by an RU, in accordance with the present disclosure. Example process 1100 is an example where the RU (e.g., RU 610) performs operations associated with a slot level configuration and control message in an O-RAN.

As shown in FIG. 11, in some aspects, process 1100 may include receiving, from a DU, a control plane message associated with a section type that is dedicated for slot level configuration information, wherein the control plane message includes a common section header that identifies a group of one or more endpoints, and one or more section type commands associated with the common section header and including information associated with a slot level common configuration that applies to the group of one or more endpoints (block 1110). For example, the RU (e.g., using reception component 1302, depicted in FIG. 13) may receive, from a DU, a control plane message associated with a section type that is dedicated for slot level configuration information, wherein the control plane message includes a common section header that identifies a group of one or more endpoints, and one or more section type commands associated with the common section header and including information associated with a slot level common configuration that applies to the group of one or more endpoints, as described above.

As further shown in FIG. 11, in some aspects, process 1100 may include performing at least one of RF configuration or time domain beamforming for the group of one or more endpoints based at least in part on the information included in the one or more section type commands (block 1120). For example, the RU (e.g., using RF configuration component 1308, depicted in FIG. 13) may perform at least one of RF configuration or time domain beamforming for the group of one or more endpoints based at least in part on the information included in the one or more section type commands, as described above.

Process 1100 may include additional aspects, such as any single aspect or any combination of aspects described below and/or in connection with one or more other processes described elsewhere herein.

In a first aspect, the common section header includes an indication of an eAxC sub-field mask that identifies the group of one or more endpoints.

In a second aspect, a transport header of the control plane message includes an indication of an eAxC identifier, the eAxC sub-field mask includes a plurality of bits associated with respective sub-fields of the eAxC identifier, and each bit of the plurality of bits indicates whether the group of one or more endpoints is based at least in part on the respective sub-field of the eAxC identifier indicated in the transport header.

In a third aspect, the plurality of bits of the eAxC sub-field mask includes a first bit associated with a DU port identifier sub-field of the eAxC identifier, a second bit associated with a band sector identifier sub-field of the eAxC identifier, a third bit associated with a component carrier identifier sub-field of the eAxC identifier, and a fourth bit associated with an RU port identifier sub-field of the eAxC identifier.

In a fourth aspect, the common section header includes a field that indicates a group of carriers or band sectors to which the one or more section type commands apply.

In a fifth aspect, the common section header includes an indication of a slot and an indication of a start symbol, and the information included in the one or more section type commands applies from the start symbol of the slot indicated in the common section header.

In a sixth aspect, the common section header includes an indication of a subcarrier spacing to which the slot level common configuration associated with the information included in the one or more section type commands applies.

In a seventh aspect, the common section header includes an indication of a quantity of the one or more section type commands included in the control plane message.

In an eighth aspect, the one or more section type commands include at least one of a TDD configuration command, an idle symbol pattern configuration command, or a time domain beam configuration command.

In a ninth aspect, each section type command of the one or more section type commands includes an indication of a command type and an indication of a command length.

In a tenth aspect, the one or more section type commands include TDD configuration command that indicates a pattern of downlink and uplink symbols for the slot level common configuration that applies to the group of one or more endpoints.

In an eleventh aspect, the TDD configuration command further indicates a pattern of guard symbols for the slot level common configuration that applies to the group of one or more endpoints.

In a twelfth aspect, the one or more section type commands include an idle symbol pattern configuration command that indicates a pattern of idle and active symbols for the slot level common configuration that applies to the group of one or more endpoints.

In a thirteenth aspect, the one or more section type commands include a time domain beam configuration command that indicates time domain analog beam information that applies to the group of one or more endpoints.

In a fourteenth aspect, the time domain beam configuration command includes an indication of a time domain beam group identifier that identifies a group of time domain beams, and a respective time domain beam identifier associated with each time domain beam of the group of time domain beams.

In a fifteenth aspect, the time domain beam configuration command further includes respective time domain beam-forming weights associated with each time domain beam of the group of time domain beams.

In a sixteenth aspect, process 1100 includes communicating with the UE based at least in part on the at least one of the radio frequency configuration or the time domain beam-forming for the group of one or more endpoints.

In a seventeenth aspect, process 1100 includes transmitting, to the DU, a management plane message including an indication that the section type is supported by the RU and an indication of one or more supported command types associated with the section type, and each of the one or more section type commands included in the control plane message is associated with a command type of the one or more supported command types indicated in the management plane message.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

FIG. 12 is a diagram illustrating an example process 1200 performed, for example, by a DU, in accordance with the present disclosure. Example process 1200 is an example where the DU (e.g., DU 605) performs operations associated with a slot level configuration and control message in an O-RAN.

As shown in FIG. 12, in some aspects, process 1200 may include transmitting, to an RU, a control plane message associated with a section type that is dedicated for slot level configuration information, wherein the control plane message includes a common section header that identifies a group of one or more endpoints, and one or more section type commands associated with the common section header and including information associated with a slot level common configuration that applies to the group of one or more endpoints (block 1210). For example, the DU (e.g., using transmission component 1404, depicted in FIG. 14) may transmit, to an RU, a control plane message associated with a section type that is dedicated for slot level configuration information, wherein the control plane message includes a common section header that identifies a group of one or more endpoints, and one or more section type commands associated with the common section header and including information associated with a slot level common configuration that applies to the group of one or more endpoints, as described above.

Process 1200 may include additional aspects, such as any single aspect or any combination of aspects described below and/or in connection with one or more other processes described elsewhere herein.

In a first aspect, the common section header includes an indication of an eAxC sub-field mask that identifies the group of one or more endpoints.

In a second aspect, a transport header of the control plane message includes an indication of an eAxC identifier, the eAxC sub-field mask includes a plurality of bits associated with respective sub-fields of the eAxC identifier, and each bit of the plurality of bits indicates whether the group of one or more endpoints is based at least in part on the respective sub-field of the eAxC identifier indicated in the transport header.

In a third aspect, the plurality of bits of the eAxC sub-field mask includes a first bit associated with a DU port identifier sub-field of the eAxC identifier, a second bit associated with a band sector identifier sub-field of the eAxC identifier, a third bit associated with a component carrier identifier sub-field of the eAxC identifier, and a fourth bit associated with an RU port identifier sub-field of the eAxC identifier.

In a fourth aspect, the common section header includes a field that indicates a group of carriers or band sectors to which the one or more section type commands apply.

In a fifth aspect, the common section header includes an indication of a slot and an indication of a start symbol, and the information included in the one or more section type commands applies from the start symbol of the slot indicated in the common section header.

In a sixth aspect, the common section header includes an indication of a subcarrier spacing to which the slot level common configuration associated with the information included in the one or more section type commands applies.

In a seventh aspect, the common section header includes an indication of a quantity of the one or more section type commands included in the control plane message.

In an eighth aspect, the one or more section type commands include at least one of a TDD configuration command, an idle symbol pattern configuration command, or a time domain beam configuration command.

In a ninth aspect, each section type command of the one or more section type commands includes an indication of a command type and an indication of a command length.

In a tenth aspect, the one or more section type commands include a TDD configuration command that indicates a pattern of downlink and uplink symbols for the slot level common configuration that applies to the group of one or more endpoints.

In an eleventh aspect, the TDD configuration command further indicates a pattern of guard symbols for the slot level common configuration that applies to the group of one or more endpoints.

In a twelfth aspect, the one or more section type commands include an idle symbol pattern configuration command that indicates a pattern of idle and active symbols for the slot level common configuration that applies to the group of one or more endpoints.

In a thirteenth aspect, the one or more section type commands include a time domain beam configuration command that indicates time domain analog beam information that applies to the group of one or more endpoints.

In a fourteenth aspect, the time domain beam configuration command includes an indication of a time domain beam group identifier that identifies a group of time domain beams, and a respective time domain beam identifier associated with each time domain beam of the group of time domain beams.

In a fifteenth aspect, the time domain beam configuration command further includes respective time domain beamforming weights associated with each time domain beam of the group of time domain beams.

In a sixteenth aspect, process 1200 includes receiving, from the RU, a management plane message including an indication that the section type is supported by the RU and an indication of one or more supported command types associated with the section type, and each of the one or more section type commands included in the control plane message is associated with a command type of the one or more supported command types indicated in the management plane message.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
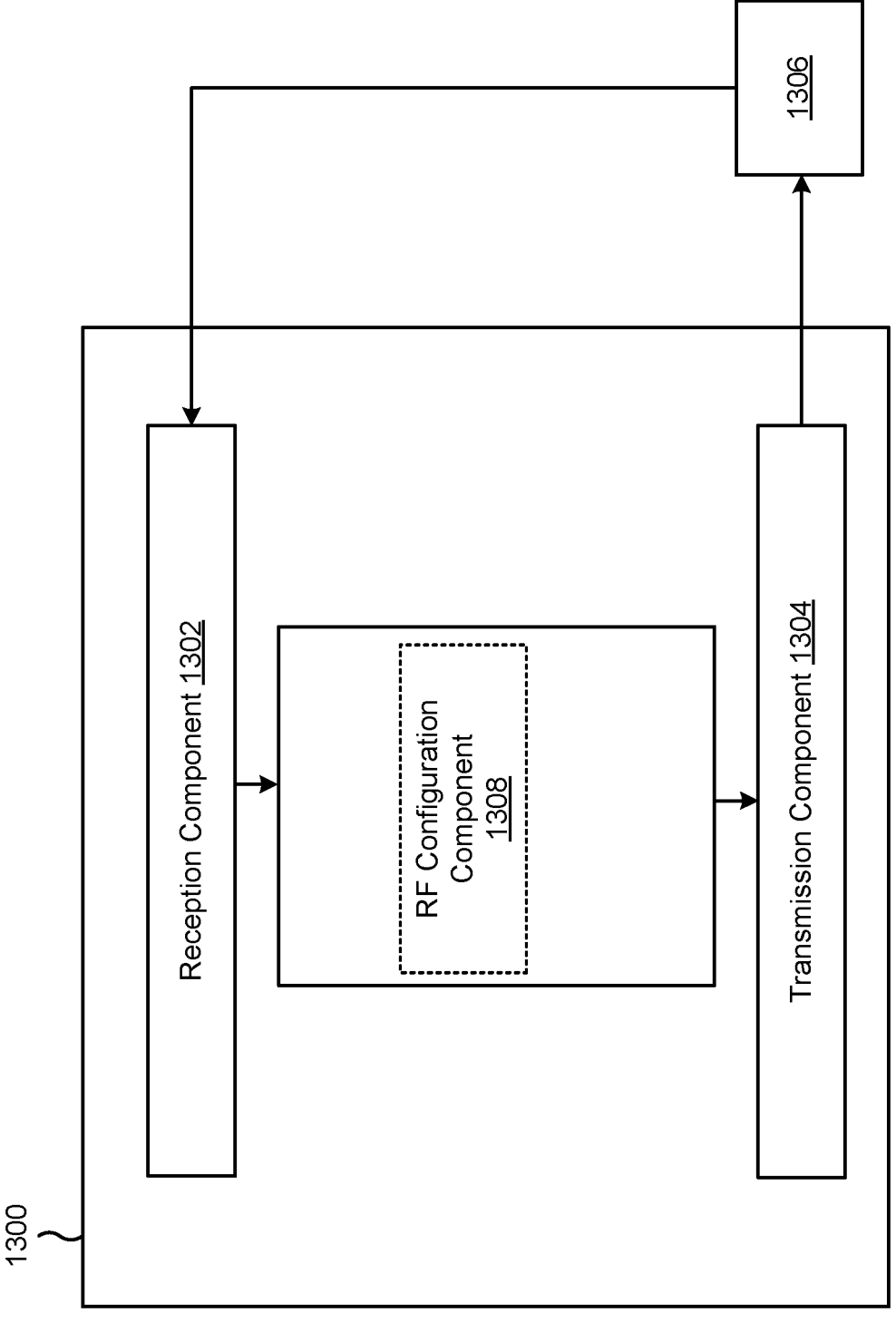
FIGS. 13-14 are diagrams of example apparatuses for wireless communication, in accordance with the present disclosure.

FIG. 13 is a diagram of an example apparatus 1300 for wireless communication. The apparatus 1300 may be a RU, or a RU may include the apparatus 1300. In some aspects, the apparatus 1300 includes a reception component 1302 and a transmission component 1304, which may be in communication with one another (for example, via one or more buses and/or one or more other components). As shown, the apparatus 1300 may communicate with another apparatus 1306 (such as a UE, a DU, or another wireless communication device) using the reception component 1302 and the transmission component 1304. As further shown, the apparatus 1300 may include an RF configuration component 1308, among other examples.

In some aspects, the apparatus 1300 may be configured to perform one or more operations described herein in connection with FIGS. 6-10. Additionally, or alternatively, the apparatus 1300 may be configured to perform one or more processes described herein, such as process 1100 of FIG. 11, or a combination thereof. In some aspects, the apparatus 1300 and/or one or more components shown in FIG. 13 may include one or more components of the RU described in connection with FIG. 2. Additionally, or alternatively, one or more components shown in FIG. 13 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1302 may receive communications, such as reference signals, control information, data communications, or a combination thereof, from the apparatus 1306. The reception component 1302 may provide received communications to one or more other components of the apparatus 1300. In some aspects, the reception component 1302 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1300. In some aspects, the reception component 1302 may include one or more antennas, a modem, a demodulator, a MIMO detector, a receive processor, a controller/processor, a memory, or a combination thereof, of the RU described in connection with FIG. 2.

The transmission component 1304 may transmit communications, such as reference signals, control information, data communications, or a combination thereof, to the apparatus 1306. In some aspects, one or more other components of the apparatus 1300 may generate communications and may provide the generated communications to the transmission component 1304 for transmission to the apparatus 1306. In some aspects, the transmission component 1304 may perform signal processing on the generated communications (such as filtering, amplification, modulation, digital-to-analog conversion, multiplexing, interleaving, mapping, or encoding, among other examples), and may transmit the processed signals to the apparatus 1306. In some aspects, the transmission component 1304 may include one or more antennas, a modem, a modulator, a transmit MIMO processor, a transmit processor, a controller/processor, a memory, or a combination thereof, of the RU described in connection with FIG. 2. In some aspects, the transmission component 1304 may be co-located with the reception component 1302 in a transceiver.

The reception component 1302 may receive, from a DU, a control plane message associated with a section type that is dedicated for slot level configuration information, wherein the control plane message includes a common section header that identifies a group of one or more endpoints, and one or more section type commands associated with the common section header and including information associated with a slot level common configuration that applies to the group of one or more endpoints. The RF configuration component 1308 may perform at least one of RF configuration or time domain beamforming for the group of one or more endpoints based at least in part on the information included in the one or more section type commands.

The reception component 1302 and/or the transmission component 1304 may communicate with the UE based at least in part on the at least one of the radio frequency configuration or the time domain beamforming for the group of one or more endpoints.

The transmission component 1304 may transmit, to the DU, a management plane message including an indication that the section type is supported by the RU and an indication of one or more supported command types associated with the section type, wherein each of the one or more section type commands included in the control plane message is associated with a command type of the one or more supported command types indicated in the management plane message.

The number and arrangement of components shown in FIG. 13 are provided as an example. In practice, there may be additional components, fewer components, different components, or differently arranged components than those shown in FIG. 13. Furthermore, two or more components shown in FIG. 13 may be implemented within a single component, or a single component shown in FIG. 13 may be implemented as multiple, distributed components. Additionally, or alternatively, a set of (one or more) components shown in FIG. 13 may perform one or more functions described as being performed by another set of components shown in FIG. 13.

Figure 14:
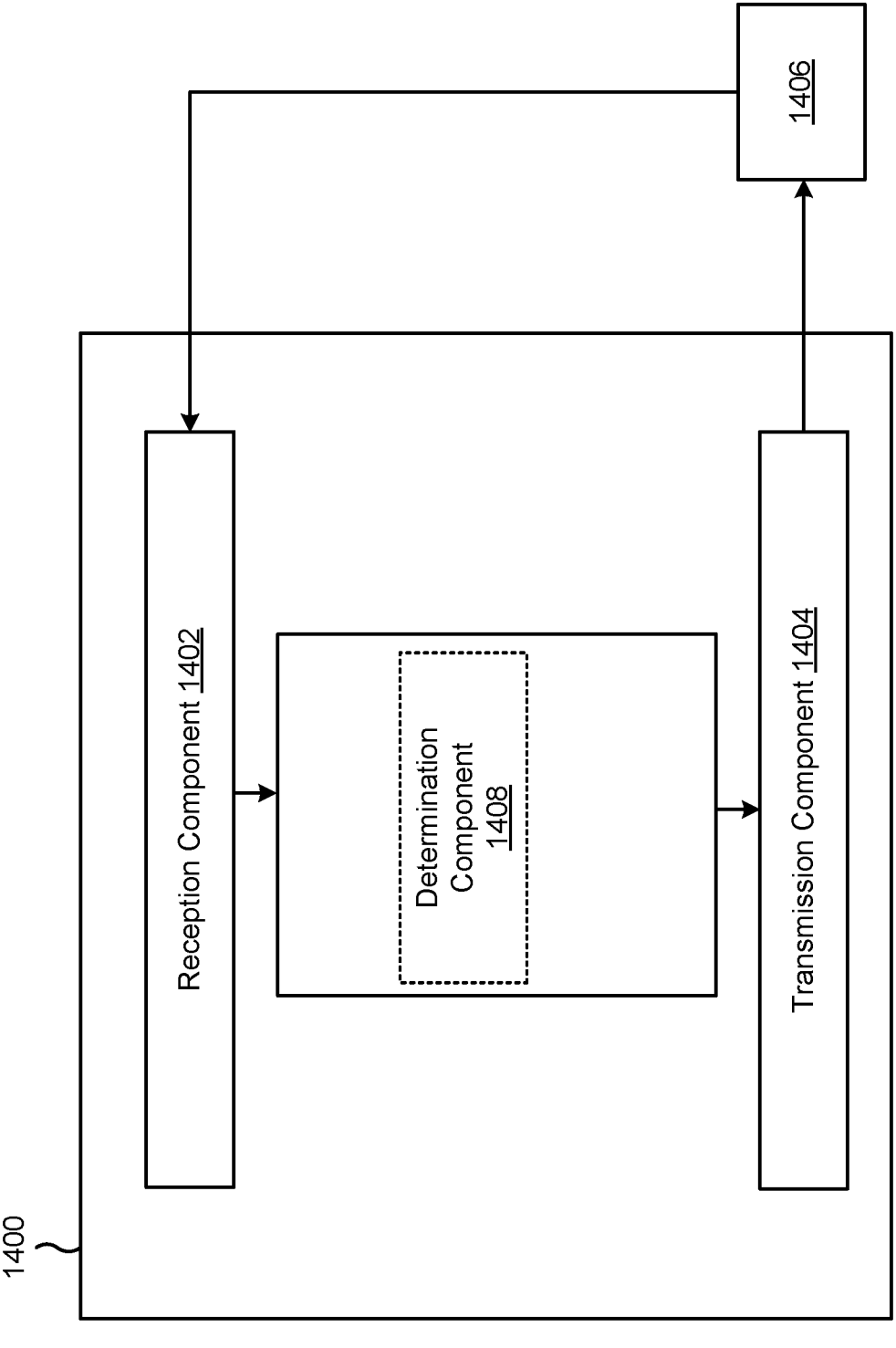

FIG. 14 is a diagram of an example apparatus 1400 for wireless communication. The apparatus 1400 may be a DU, or a DU may include the apparatus 1400. In some aspects, the apparatus 1400 includes a reception component 1402 and a transmission component 1404, which may be in communication with one another (for example, via one or more buses and/or one or more other components). As shown, the apparatus 1400 may communicate with another apparatus 1406 (such an RU or another wireless communication device) using the reception component 1402 and the transmission component 1404. As further shown, the apparatus 1400 may include a determination component 1408, among other examples.

In some aspects, the apparatus 1400 may be configured to perform one or more operations described herein in connection with FIGS. 6-10. Additionally, or alternatively, the apparatus 1400 may be configured to perform one or more processes described herein, such as process 1200 of FIG. 12, or a combination thereof. In some aspects, the apparatus 1400 and/or one or more components shown in FIG. 14 may include one or more components of the DU described in connection with FIG. 2. Additionally, or alternatively, one or more components shown in FIG. 14 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1402 may receive communications, such as reference signals, control information, data communications, or a combination thereof, from the apparatus 1406. The reception component 1402 may provide received communications to one or more other components of the apparatus 1400. In some aspects, the reception component 1402 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1400. In some aspects, the reception component 1402 may include one or more antennas, a modem, a demodulator, a MIMO detector, a receive processor, a controller/processor, a memory, or a combination thereof, of the DU described in connection with FIG. 2.

The transmission component 1404 may transmit communications, such as reference signals, control information, data communications, or a combination thereof, to the apparatus 1406. In some aspects, one or more other components of the apparatus 1400 may generate communications and may provide the generated communications to the transmission component 1404 for transmission to the apparatus 1406. In some aspects, the transmission component 1404 may perform signal processing on the generated communications (such as filtering, amplification, modulation, digital-to-analog conversion, multiplexing, interleaving, mapping, or encoding, among other examples), and may transmit the processed signals to the apparatus 1406. In some aspects, the transmission component 1404 may include one or more antennas, a modem, a modulator, a transmit MIMO processor, a transmit processor, a controller/processor, a memory, or a combination thereof, of the DU described in connection with FIG. 2. In some aspects, the transmission component 1404 may be co-located with the reception component 1402 in a transceiver.

The transmission component 1404 may transmit, to an RU, a control plane message associated with a section type that is dedicated for slot level configuration information, wherein the control plane message includes a common section header that identifies a group of one or more endpoints, and one or more section type commands associated with the common section header and including information associated with a slot level common configuration that applies to the group of one or more endpoints.

The determination component 1408 may determine the information associated with a slot level common configuration that applies to the group of one or more endpoints.

The reception component 1402 may receive, from the RU, a management plane message including an indication that the section type is supported by the RU and an indication of one or more supported command types associated with the section type, wherein each of the one or more section type commands included in the control plane message is associated with a command type of the one or more supported command types indicated in the management plane message.

The number and arrangement of components shown in FIG. 14 are provided as an example. In practice, there may be additional components, fewer components, different components, or differently arranged components than those shown in FIG. 14. Furthermore, two or more components shown in FIG. 14 may be implemented within a single component, or a single component shown in FIG. 14 may be implemented as multiple, distributed components. Additionally, or alternatively, a set of (one or more) components shown in FIG. 14 may perform one or more functions described as being performed by another set of components shown in FIG. 14.

The following provides an overview of some Aspects of the present disclosure:

Aspect 1: A method of wireless communication performed by a radio unit (RU), comprising: receiving, from a distributed unit (DU), a control plane message associated with a section type that is dedicated for slot level configuration information, wherein the control plane message includes: a common section header that identifies a group of one or more endpoints, and one or more section type commands associated with the common section header, wherein the one or more section type commands include information associated with a slot level common configuration that applies to the group of one or more endpoints; and performing at least one of radio frequency configuration or time domain beamforming for the group of one or more endpoints based at least in part on the information included in the one or more section type commands.

Aspect 2: The method of Aspect 1, wherein the common section header includes an indication of an extended antenna-carrier (eAxC) sub-field mask that identifies the group of one or more endpoints.

Aspect 3: The method of Aspect 2, wherein a transport header of the control plane message includes an indication of an eAxC identifier, wherein the eAxC sub-field mask includes a plurality of bits associated with respective sub-fields of the eAxC identifier, and wherein each bit of the plurality of bits indicates whether the group of one or more endpoints is based at least in part on the respective sub-field of the eAxC identifier indicated in the transport header.

Aspect 4: The method of Aspect 3, wherein the plurality of bits of the eAxC sub-field mask includes a first bit associated with a DU port identifier sub-field of the eAxC identifier, a second bit associated with a band sector identifier sub-field of the eAxC identifier, a third bit associated with a component carrier identifier sub-field of the eAxC identifier, and a fourth bit associated with an RU port identifier sub-field of the eAxC identifier.

Aspect 5: The method of any of Aspects 1-4, wherein the common section header includes a field that indicates a group of carriers or band sectors to which the one or more section type commands apply.

Aspect 6: The method of any of Aspects 1-5, wherein the common section header includes an indication of a slot and an indication of a start symbol, and wherein the information included in the one or more section type commands applies from the start symbol of the slot indicated in the common section header.

Aspect 7: The method of any of Aspects 1-6, wherein the common section header includes an indication of a subcarrier spacing to which the slot level common configuration associated with the information included in the one or more section type commands applies.

Aspect 8: The method of any of Aspects 1-7, wherein the common section header includes an indication of a quantity of the one or more section type commands included in the control plane message.

Aspect 9: The method of any of Aspects 1-8, wherein the one or more section type commands include at least one of a time domain duplex (TDD) configuration command, an idle symbol pattern configuration command, or a time domain beam configuration command.

Aspect 10: The method of Aspect 9, wherein each section type command of the one or more section type commands includes an indication of a command type and an indication of a command length.

Aspect 11: The method of any of Aspects 1-10, wherein the one or more section type commands include a time domain duplex (TDD) configuration command that indicates a pattern of downlink and uplink symbols for the slot level common configuration that applies to the group of one or more endpoints.

Aspect 12: The method of Aspect 11, wherein the TDD configuration command further indicates a pattern of guard symbols for the slot level common configuration that applies to the group of one or more endpoints.

Aspect 13: The method of any of Aspects 1-12, wherein the one or more section type commands include an idle symbol pattern configuration command that indicates a pattern of idle and active symbols for the slot level common configuration that applies to the group of one or more endpoints.

Aspect 14: The method of any of Aspects 1-13, wherein the one or more section type commands include a time domain beam configuration command that indicates time domain analog beam information that applies to the group of one or more endpoints.

Aspect 15: The method of Aspect 14, wherein the time domain beam configuration command includes an indication of a time domain beam group identifier that identifies a group of time domain beams, and a respective time domain beam identifier associated with each time domain beam of the group of time domain beams.

Aspect 16: The method of Aspect 15, wherein the time domain beam configuration command further includes respective time domain beamforming weights associated with each time domain beam of the group of time domain beams.

Aspect 17: The method of any of Aspects 1-16, further comprising: communicating with a UE based at least in part on the at least one of the radio frequency configuration or the time domain beamforming for the group of one or more endpoints.

Aspect 18: The method of any of Aspects 1-17, further comprising: transmitting, to the DU, a management plane message including an indication that the section type is supported by the RU and an indication of one or more supported command types associated with the section type, wherein each of the one or more section type commands included in the control plane message is associated with a command type of the one or more supported command types indicated in the management plane message.

Aspect 19: A method of wireless communication performed by a distributed unit (DU), comprising: transmitting, to a radio unit (RU), a control plane message associated with a section type that is dedicated for slot level configuration information, wherein the control plane message includes: a common section header that identifies a group of one or more endpoints, and one or more section type commands associated with the common section header, wherein the one or more section type commands include information associated with a slot level common configuration that applies to the group of one or more endpoints.

Aspect 20: The method of Aspect 19, wherein the common section header includes an indication of an extended antenna-carrier (eAxC) sub-field mask that identifies the group of one or more endpoints.

Aspect 21: The method of Aspect 20, wherein a transport header of the control plane message includes an indication of an eAxC identifier, wherein the eAxC sub-field mask includes a plurality of bits associated with respective sub-fields of the eAxC identifier, and wherein each bit of the plurality of bits indicates whether the group of one or more endpoints is based at least in part on the respective sub-field of the eAxC identifier indicated in the transport header.

Aspect 22: The method of Aspect 21, wherein the plurality of bits of the eAxC sub-field mask includes a first bit associated with a DU port identifier sub-field of the eAxC identifier, a second bit associated with a band sector identifier sub-field of the eAxC identifier, a third bit associated with a component carrier identifier sub-field of the eAxC identifier, and a fourth bit associated with an RU port identifier sub-field of the eAxC identifier.

Aspect 23: The method of any of Aspects 19-22, wherein the common section header includes a field that indicates a group of carriers or band sectors to which the one or more section type commands apply.

Aspect 24: The method of any of Aspects 19-23, wherein the common section header includes an indication of a slot and an indication of a start symbol, and wherein the information included in the one or more section type commands applies from the start symbol of the slot indicated in the common section header to a last symbol of the slot indicated in the common section header.

Aspect 25: The method of any of Aspects 19-24, wherein the common section header includes an indication of a subcarrier spacing to which the slot level common configuration associated with the information included in the one or more section type commands applies.

Aspect 26: The method of any of Aspects 19-25, wherein the common section header includes an indication of a quantity of the one or more section type commands included in the control plane message.

Aspect 27: The method of any of Aspects 19-26, wherein the one or more section type commands include at least one of a time domain duplex (TDD) configuration command, an idle symbol pattern configuration command, or a time domain beam configuration command.

Aspect 28: The method of Aspect 27, wherein each section type command of the one or more section type commands includes an indication of a command type and an indication of a command length.

Aspect 29: The method of any of Aspects 19-28, wherein the one or more section type commands include a time domain duplex (TDD) configuration command that indicates a pattern of downlink and uplink symbols for the slot level common configuration that applies to the group of one or more endpoints.

Aspect 30: The method of Aspect 29, wherein the TDD configuration command further indicates a pattern of guard symbols for the slot level common configuration that applies to the group of one or more endpoints.

Aspect 31: The method of any of Aspects 19-30, wherein the one or more section type commands include an idle symbol pattern configuration command that indicates a pattern of idle and active symbols for the slot level common configuration that applies to the group of one or more endpoints.

Aspect 32: The method of any of Aspects 19-31, wherein the one or more section type commands include a time domain beam configuration command that indicates time domain analog beam information that applies to the group of one or more endpoints.

Aspect 33: The method of Aspect 32, wherein the time domain beam configuration command includes an indication of a time domain beam group identifier that identifies a group of time domain beams, and a respective time domain beam identifier associated with each time domain beam of the group of time domain beams.

Aspect 34: The method of Aspect 33, wherein the time domain beam configuration command further includes respective time domain beamforming weights associated with each time domain beam of the group of time domain beams.

Aspect 35: The method of any of Aspects 19-34, further comprising: receiving, from the RU, a management plane message including an indication that the section type is supported by the RU and an indication of one or more supported command types associated with the section type, wherein each of the one or more section type commands included in the control plane message is associated with a command type of the one or more supported command types indicated in the management plane message.

Aspect 36: An apparatus for wireless communication at a device, comprising a processor; memory coupled with the processor; and instructions stored in the memory and executable by the processor to cause the apparatus to perform the method of one or more of Aspects 1-18.

Aspect 37: A device for wireless communication, comprising a memory and one or more processors coupled to the memory, the one or more processors configured to perform the method of one or more of Aspects 1-18.

Aspect 38: An apparatus for wireless communication, comprising at least one means for performing the method of one or more of Aspects 1-18.

Aspect 39: A non-transitory computer-readable medium storing code for wireless communication, the code comprising instructions executable by a processor to perform the method of one or more of Aspects 1-18.

Aspect 40: A non-transitory computer-readable medium storing a set of instructions for wireless communication, the set of instructions comprising one or more instructions that, when executed by one or more processors of a device, cause the device to perform the method of one or more of Aspects 1-18.

Aspect 41: An apparatus for wireless communication at a device, comprising a processor; memory coupled with the processor; and instructions stored in the memory and executable by the processor to cause the apparatus to perform the method of one or more of Aspects 19-35.

Aspect 42: A device for wireless communication, comprising a memory and one or more processors coupled to the memory, the one or more processors configured to perform the method of one or more of Aspects 19-35.

Aspect 43: An apparatus for wireless communication, comprising at least one means for performing the method of one or more of Aspects 19-35.

Aspect 44: A non-transitory computer-readable medium storing code for wireless communication, the code comprising instructions executable by a processor to perform the method of one or more of Aspects 19-35.

Aspect 45: A non-transitory computer-readable medium storing a set of instructions for wireless communication, the set of instructions comprising one or more instructions that, when executed by one or more processors of a device, cause the device to perform the method of one or more of Aspects 19-35.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A radio unit (RU) for wireless communication, comprising:

one or more memories; and one or more processors, coupled to the one or more memories, configured to:

receive, from a distributed unit (DU), a control plane message associated with a section type that is dedicated for slot level configuration information, wherein the control plane message includes:

a common section header that identifies a group of one or more endpoints, and one or more section type commands associated with the common section header, wherein the one or more section type commands include information associated with a slot level common configuration that applies to the group of one or more endpoints, and wherein the common section header includes an indication of a quantity of the one or more section type commands included in the control plane message; and perform at least one of radio frequency configuration or time domain beamforming for the group of one or more endpoints based at least in part on the information included in the one or more section type commands.

2. The RU of claim 1, wherein the common section header includes a field that indicates a group of carriers or band sectors to which the one or more section type commands apply.

3. The RU of claim 1, wherein the common section header includes an indication of a slot and an indication of a start symbol, and wherein the information included in the one or more section type commands applies from the start symbol of the slot indicated in the common section header.

4. The RU of claim 1, wherein the common section header includes an indication of a subcarrier spacing to which the slot level common configuration associated with the information included in the one or more section type commands applies.

5. The RU of claim 1, wherein the one or more section type commands include at least one of a time domain duplex (TDD) configuration command, an idle symbol pattern configuration command, or a time domain beam configuration command.

6. The RU of claim 5, wherein each section type command of the one or more section type commands includes an indication of a command type and an indication of a command length.

7. The RU of claim 1, wherein the one or more section type commands include a time domain duplex (TDD) configuration command that indicates a pattern of downlink and uplink symbols for the slot level common configuration that applies to the group of one or more endpoints.

8. The RU of claim 7, wherein the TDD configuration command further indicates a pattern of guard symbols for the slot level common configuration that applies to the group of one or more endpoints.

9. The RU of claim 1, wherein the one or more section type commands include an idle symbol pattern configuration command that indicates a pattern of idle and active symbols for the slot level common configuration that applies to the group of one or more endpoints.

10. The RU of claim 1, wherein the one or more section type commands include a time domain beam configuration command that indicates time domain beam information that applies to the group of endpoints.

11. The RU of claim 10, wherein the time domain beam configuration command includes an indication of a time domain beam group identifier that identifies a group of time domain beams, and a respective time domain beam identifier associated with each time domain beam of the group of time domain beams.

12. The RU of claim 11, wherein the time domain beam configuration command further includes respective time domain beamforming weights associated with each time domain beam of the group of time domain beams.

13. The RU of claim 1, wherein the one or more processors are further configured to:

communicate with a UE based at least in part on the at least one of the radio frequency configuration or the time domain beamforming for the group of one or more endpoints.

14. The RU of claim 1, wherein the one or more processors are further configured to:

transmit, to the DU, a management plane message including an indication that the section type is supported by the RU and an indication of one or more supported command types associated with the section type, wherein each of the one or more section type commands included in the control plane message is associated with a command type of the one or more supported command types indicated in the management plane message.

15. A distributed unit (DU) for wireless communication, comprising:

one or more memories; and one or more processors, coupled to the one or more memories, configured to:

transmit, to a radio unit (RU), a control plane message associated with a section type that is dedicated for slot level configuration information, wherein the control plane message includes:

a common section header that identifies a group of one or more endpoints, and one or more section type commands associated with the common section header, wherein the one or more section type commands include information associated with a slot level common configuration that applies to the group of endpoints, and wherein the common section header includes an indication of a quantity of the one or more section type commands included in the control plane message.

16. The DU of claim 15, wherein the common section header includes a field that indicates a group of carriers or band sectors to which the one or more section type commands apply.

17. The DU of claim 15, wherein the common section header includes an indication of a slot and an indication of a start symbol, and wherein the information included in the one or more section type commands applies from the start symbol of the slot indicated in the common section header.

18. The DU of claim 15, wherein the common section header includes an indication of a subcarrier spacing to which the slot level common configuration associated with the information included in the one or more section type commands applies.

19. The DU of claim 15, wherein the one or more section type commands include at least one of a time domain duplex (TDD) configuration command, an idle symbol pattern configuration command, or a time domain beam configuration command.

20. The DU of claim 15, wherein each section type command of the one or more section type commands includes an indication of a command type and an indication of a command length.

21. The DU of claim 15, wherein the one or more section type commands include a time domain duplex (TDD) configuration command that indicates a pattern of downlink and uplink symbols for the slot level common configuration that applies to the group of one or more endpoints.

22. The DU of claim 21, wherein the TDD configuration command further indicates a pattern of guard symbols for the slot level common configuration that applies to the group of one or more endpoints.

23. The DU of claim 15, wherein the one or more section type commands include an idle symbol pattern configuration command that indicates a pattern of idle and active symbols for the slot level common configuration that applies to the group of one or more endpoints.

24. The DU of claim 15, wherein the one or more section type commands include a time domain beam configuration command that indicates time domain beam information that applies to the group of one or more endpoints.

25. The DU of claim 24, wherein the time domain beam configuration command includes an indication of a time domain beam group identifier that identifies a group of time domain beams, and a respective time domain beam identifier associated with each time domain beam of the group of time domain beams.

26. The DU of claim 24, wherein the time domain beam configuration command further includes respective time domain beamforming weights associated with each time domain beam of the group of time domain beams.

27. A method of wireless communication performed by a radio unit (RU), comprising:

receiving, from a distributed unit (DU), a control plane message associated with a section type that is dedicated for slot level configuration information, wherein the control plane message includes:

a common section header that identifies a group of one or more endpoints, and one or more section type commands associated with the common section header, wherein the one or more section type commands include information associated with a slot level common configuration that applies to the group of one or more endpoints, and wherein the common section header includes an indication of a quantity of the one or more section type commands included in the control plane message; and performing at least one of radio frequency configuration or time domain beamforming for the group of one or more endpoints based at least in part on the information included in the one or more section type commands.

28. A method of wireless communication performed by a distributed unit (DU), comprising:

transmitting, to a radio unit (RU), a control plane message associated with a section type that is dedicated for slot level configuration information, wherein the control plane message includes:

a common section header that identifies a group of one or more endpoints, and one or more section type commands associated with the common section header, wherein the one or more section type commands include information associated with a slot level common configuration that applies to the group of one or more endpoints, and wherein the common section header includes an indication of a quantity of the one or more section type commands included in the control plane message.

29. The method of claim 27, wherein the common section header includes a field that indicates a group of carriers or band sectors to which the one or more section type commands apply.

30. The method of claim 28, wherein the common section header includes a field that indicates a group of carriers or band sectors to which the one or more section type commands apply.

\* \* \* \* \*